(12) United States Patent
Choi

(10) Patent No.: US 11,320,637 B2
(45) Date of Patent: May 3, 2022

(54) SMALL FORM FACTOR 4-MIRROR BASED IMAGING SYSTEMS

(71) Applicant: Youngwan Choi, Los Angeles, CA (US)

(72) Inventor: Youngwan Choi, Los Angeles, CA (US)

(73) Assignee: Youngwan Choi, Marina del Rey, CA (US)

( * ) Notice: Subject to any disclaimer, the term of this patent is extended or adjusted under 35 U.S.C. 154(b) by 0 days.

(21) Appl. No.: 16/989,635

(22) Filed: Aug. 10, 2020

(65) Prior Publication Data
US 2021/0041678 A1  Feb. 11, 2021

Related U.S. Application Data

(60) Provisional application No. 62/885,296, filed on Aug. 11, 2019.

(51) Int. Cl.
*G02B 17/06* (2006.01)
*G02B 17/02* (2006.01)

(52) U.S. Cl.
CPC ....... *G02B 17/0657* (2013.01); *G02B 17/023* (2013.01)

(58) Field of Classification Search
CPC ...... G02B 13/004; G02B 9/34; G02B 13/002; G02B 13/0065; G02B 13/009; G02B 13/02; G02B 13/18
See application file for complete search history.

(56) References Cited

U.S. PATENT DOCUMENTS

| 4,101,195 A | 7/1978 | Korsch |
| 5,631,770 A | 5/1997 | Jarmuz |

(Continued)

FOREIGN PATENT DOCUMENTS

| CA | 2647405 A1 | 6/2009 |
| CN | 102866487 A | 1/2013 |

(Continued)

OTHER PUBLICATIONS

Riehl et al., The Raytheon DB-110 Sensor: Four Cameras in One Package, Raytheon Company, Nov. 1999.

(Continued)

*Primary Examiner* — Jade R Chwasz
(74) *Attorney, Agent, or Firm* — Knobbe, Martens, Olson & Bear, LLP

(57) ABSTRACT

An all-reflective optical system is described including a concave primary mirror having a central aperture and a radius, the primary mirror having one of a parabolic, non-parabolic conical, or aspherical surface, a convex secondary mirror facing the primary mirror, the secondary mirror having an aspherical surface, where an optical axis extends from a vertex of the primary mirror to a vertex of the secondary mirror, a concave tertiary mirror arranged behind the primary mirror, the tertiary mirror having one of a parabolic, non-parabolic conical or aspherical surface, a concave quaternary mirror arranged in the central aperture of the primary mirror or behind the primary mirror, the quaternary mirror having one of a spherical, parabolic, non-parabolic conical or aspherical surface, and at least one image plane having one or more aggregated sensors, wherein the image plane is positioned at a radial distance from the optical axis that is no more than the radius of the primary mirror.

22 Claims, 21 Drawing Sheets

(56) References Cited

U.S. PATENT DOCUMENTS

| | | | |
|---|---|---|---|
| 5,841,574 | A | 11/1998 | Willey |
| 6,333,811 | B1 | 12/2001 | Tatian et al. |
| 6,366,734 | B1 | 4/2002 | Beran et al. |
| 6,374,047 | B1 | 4/2002 | Beran et al. |
| 6,826,358 | B2 | 11/2004 | Partynski et al. |
| 6,969,176 | B2 | 11/2005 | Pohle |
| 7,031,059 | B1 | 4/2006 | Costes |
| 7,049,597 | B2 | 5/2006 | Bodkin |
| 7,082,001 | B2 | 7/2006 | Vizgaitis |
| 8,023,183 | B1 | 9/2011 | Cook |
| 8,123,371 | B2 | 2/2012 | Cook |
| 8,427,744 | B2 | 4/2013 | Cook |
| 8,534,851 | B2 | 9/2013 | Spencer |
| 9,377,614 | B2 | 6/2016 | Laborde et al. |
| 2007/0109637 | A1 | 5/2007 | Cook |
| 2008/0266687 | A1 | 10/2008 | Cook |
| 2009/0009897 | A1* | 1/2009 | Holota ............... G02B 17/0657 359/859 |
| 2010/0065725 | A1 | 3/2010 | Blanc et al. |
| 2011/0176205 | A1* | 7/2011 | Shaw ..................... G02B 23/06 359/365 |
| 2016/0341948 | A1 | 11/2016 | Tetaz et al. |
| 2016/0370562 | A1 | 12/2016 | Zhang et al. |
| 2019/0121114 | A1 | 4/2019 | Tetaz et al. |
| 2020/0218055 | A1 | 7/2020 | Tran et al. |

FOREIGN PATENT DOCUMENTS

| | | |
|---|---|---|
| CN | 103207452 A | 7/2013 |
| CN | 103278916 A | 9/2013 |
| CN | 104977621 A | 10/2015 |
| CN | 205581405 U | 9/2016 |
| CN | 107966804 A | 4/2018 |
| CN | 108957715 A | 12/2018 |
| CN | 109343206 A | 2/2019 |
| CN | 109459344 A | 3/2019 |
| CN | 110262024 A | 9/2019 |
| CN | 110989152 A | 4/2020 |
| CN | 111123503 A | 5/2020 |
| DE | 102016100478 B4 | 11/2017 |
| FR | 3073631 A1 | 5/2019 |
| KR | 10-1807414 | 12/2017 |
| WO | WO 02/19030 A1 | 3/2002 |
| WO | WO 2016/160625 A1 | 6/2016 |

OTHER PUBLICATIONS

Savini, G., et al. "TWINKLE: a low earth orbit visible and infrared exoplanet spectroscopy observatory." Space Telescopes and Instrumentation 2016: Opticalm Infrared, and Millimeter Wave. vol. 9904. International Society for Optics and Photonics. 2018.

Simonetti, Francesca, et al. "Reflecting telescopes for an orbiting high-resolution camera for Earth observation." Optical Engineering 45.5 (2006): 053001.

Lampton, M., and M. Sholl. "Comparison of on-axis three-mirror-anastigmat telescopes." UV/Optical/IR Space Telescopes: Innovative Technologies and Concepts III. vol. 6687. International Society for Optics and Photonics, 2007.

Chrisp, Michael P., Brian Primeau, and Michael A. Echter. "Imaging freeform optical systems designed with NURBS surfaces." Optical Engineering 55.7 (2016): 071208.

Cook, Lacy G. "The last three-mirror anastigmat?." Lens Design: A Critical Review. vol. 10263. International Society for Optics and Photonics, 1992.

Jahn, Wilfried, Marc Ferrari, and Emmanuel Hugot. "Innovative focal plane design for large space telescopes." Space Telescopes and Instrumentation 2016: Optical, Infrared, and Millimeter Wave. vol. 9904. International Society for Optics and Photonics, 2016.

Gaudin-Delrieu, Catherine, et al. "The high resolution optical instruments for the Pleiades HR Earth observation satellites." International Conference on Space Optics—ICSO 2008. vol. 10566. International Society for Optics and Photonics, 2017.

Fayret, Jean-Philippe, et al. "Conception d'instrument pour une mission d'observation haute resolution et grand champ." International Conference on Space Optics—ICSO 2000. vol. 10569. International Society for Optics and Photonics, 2017.

Choi, Youngwan, "Study on the feasibility of micro camera systems for asynchronous, gigantic satellite constellation." Earth Observing Systems XXIV. vol. 11127. International Society for Optics and Photonics, 2019.

Korsch, Dietrich, "A three-mirror space telescope." Optical Engineering 14.6 (1975): 146533.

Costes, Vincent, Guillaume Cassar, and Laurent Escarrat. "Optical design of a compact telescope for the next generation earth observation system." International Conference on Space Optics—ICSO 2012. vol. 10584. International Society for Optics and Photonics, 2017.

Selimoglu, Ozgur, Mustafa Ekinci, and Ozgur Karci: "Thermal refocusing method for spaceborne high-resolution optical imagers." Applied optics 55.15 (2016): 4109-4112.

Metwally, Mohamed, Taber M. Bazan, and Fawzy Eltohamy. "Design of Very High-Resolution Satellite Telescopes Part I: Optical System Design." IEEE Transactions on Aerospace and Electronic Systems 56.2 (2019): 1202-1208.

Miravet, C., et al. "Development status of the telescope for the Ingenio/SEOSAT mission primary payload." Optical Design and Engineering IV. vol. 8167. International Society for Optics and Photonics, 2011.

Baker, Adam, et al. "Reading the fine print from orbit: its not just about the resolution." (2008).

PCT International Search Report for International Application No. PCT/US20/45639 dated Oct. 29, 2020.

International Preliminary Report on Patentability for International Application No. PCT/US2020/045639, dated Aug. 9, 2021.

* cited by examiner

SMALL FORM FACTOR 4-MIRROR BASED IMAGING SYSTEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims priority to U.S. Provisional Application No. 62/885,296, filed Aug. 11, 2019, the entire contents of which are hereby incorporated by reference in their entirety for all purposes and form a part of the present specification.

BACKGROUND

Field

This disclosure relates generally to optical imaging systems, and more specifically to small form factor four-mirror based optical imaging systems for use in satellites or aerial vehicles.

Description of the Related Art

Optical imaging systems are useful in many applications such as imaging planets or stars. Known optical system designs for satellite imaging include a traditional Three Mirror Anastigmat (TMA) design and a Korsch design. Existing solutions to optical imaging have drawbacks with regard to size and corresponding resolution capability. Improvements in optical imaging are therefore desirable.

SUMMARY

In one aspect, an all-reflective optical system is disclosed. The all-reflective optical system comprises a concave primary mirror having a central aperture and a radius, the primary mirror having one of a parabolic, non-parabolic conical, or aspherical surface; a convex secondary mirror facing the primary mirror, the secondary mirror having an aspherical surface, where an optical axis extends from a vertex of the primary mirror to a vertex of the secondary mirror; a concave tertiary mirror arranged behind the primary mirror, the tertiary mirror having one of a parabolic, non-parabolic conical or aspherical surface; a concave quaternary mirror arranged in the central aperture of the primary mirror or behind the primary mirror, the quaternary mirror having one of a spherical, parabolic, non-parabolic conical or aspherical surface; and at least one image plane having one or more aggregated sensors. The image plane is positioned at a distance from the optical axis that is no more than the radius of the primary mirror.

In some embodiments, the optical system may additionally comprise an entrance pupil positioned near the primary mirror or the secondary mirror, and an exit pupil or Lyot stop positioned at one of 1) near the quaternary mirror, 2) between the tertiary mirror and the quaternary mirror, and 3) between the quaternary mirror and the image plane.

In some embodiments, the optical system may additionally comprise one or more folding mirrors arranged to deflect rays from the quaternary mirror to the image plane, wherein the one or more folding mirrors may be configured to fold a ray path. Based on using a first folding mirror, the exit pupil may be positioned between the tertiary and the quaternary mirror, or between the quaternary mirror and the first folding mirror. One of the folding mirrors may be tilted at a specific angle to an optical axis of the system. One of the folding mirrors positioned at the front of the image plane may widen the field of view with reflective and transmissive sections over a same spectral range, wherein each section may correspond to a specific sensor of the one or more sensors. One of the folding mirrors positioned at the front of the image plane may enable simultaneous multi-color imaging, wherein the one of the folding mirrors may be reflective over a first spectral range and transmissive over other spectral ranges, and may be reflective over a second spectral range and transmissive over other spectral ranges, wherein one of the aggregated sensors may be dedicated to the first spectral range and a different one of the aggregated sensors may be dedicated to the second spectral range.

In some embodiments, a form factor, defined as a ratio of a distance between the secondary mirror and the tertiary mirror to an effective focal length of the optical system, may be less than 0.09. Vertices of the primary mirror and the secondary mirror may form an optical axis, which may be a geometric reference line extending from the vertex of the primary mirror to the vertex of the secondary mirror. The primary mirror and the secondary mirror may be symmetric or periodic about the optical axis. A diagonal of a periodic mirror may have an angle of zero degrees or 45 degrees from a diagonal of the image plane. The optical axis of the tertiary mirror may not coincide with a mechanical axis.

In some embodiments, a radius of the secondary mirror may be in a range of 1% to 3% of an effective focal length, and a radius of the tertiary mirror may be in a range of 2% to 3% of the effective focal length. A radius of the quaternary mirror may be in a range of 6% to 22% of an effective focal length.

In some embodiments, the folding mirrors may enable simultaneous multi-color imaging, wherein each of the folding mirrors may be reflective over a particular spectral range and transmissive over other spectral ranges, and wherein each added folding mirror and a corresponding one of the aggregated sensors may be associated with a different spectral range.

In some embodiments, a distance from the tertiary mirror to the image plane along the optical axis may be in a range of 3% to 9% of an effective focal length and the distance from the secondary mirror to the tertiary mirror along the optical axis may be in a range of 4% to 9% of the effective focal length. The system may have an imaging resolution better than 1 m at a 500 km altitude.

In some embodiments, the system may be adapted to support simultaneous multi-color imaging, including 1) panchromatic and RGB and near-infrared, 2) visible and infrared (near-infrared, shortwave infrared, mid-wave infrared, or longwave infrared), 3) visible and visible, 4) infrared and infrared, 5) UV and visible, or 6) UV and infrared imaging.

In some embodiments, a diameter of the primary mirror may range from 3% to 8% of an effective focal length. A focal point distance from the primary mirrors may be in a range of 1% to 6% of an effective focal length. An effective focal length may be in a range of 300 mm to 20,000 mm. The optical system may further comprise a supporting structure for one or more of the mirrors. The supporting structure may be additively manufactured.

In some embodiments, the image plane may comprise a charge coupled device (CCD)-in CMOS time delay integration (TDI) sensor. The CCD-in-CMOS TDI sensor may be a multispectral TDI, backside illumination imager. The CCD-in-CMOS TDI sensor may comprise seven CCD arrays of 4096×256 pixels each. The CCD-in-CMOS TDI sensor may comprise four panchromatic CCD arrays of 16384×96 pixels each and eight multispectral CCD arrays of 8192×48 pixels.

In some embodiments, the primary mirror may have a circular or a non-circular shape, the tertiary mirror may have a segmented non-circular shape, and the quaternary mirror has a circular or non-circular shape. The non-circular shape of the primary mirror may enhance a modulation transfer function (MTF) and a signal to noise ratio (SNR).

In some embodiments, the quaternary mirror may face the tertiary mirror and may be positioned to avoid interference with rays from the secondary mirror to the tertiary mirror. The optical system may additionally comprise a supporting structure of the mirrors including a cylindrical tube or a conical baffle of the primary mirror. The four mirrors may be constructed of zero-CTE materials, low-CTE materials, or mild-CTE materials, wherein the four mirrors and a supporting structure may be made of one material. The system may be adapted to provide imaging in the modes of starring, scanning or pushbroom, video, stereo, BRDF (Bidirectional Reflectance Distribution Function), HDR (High Dynamic Range), polarimetric and low-light.

In some embodiments, the system may be adapted to be installed onboard satellites purposed for a non-imaging mission including communication satellites, or installed on imaging satellites, quasi-imaging satellites, or scientific mission satellites. The system may be adapted to be installed onboard airplanes, drones, unmanned aerial vehicles, and balloons. A back focal length between the quaternary mirror and the at least one image plane may be in a range of 2% to 5% of an effective focal length.

In another aspect, an all-reflective optical system is disclosed comprising a concave primary mirror having a central aperture and a radius, the primary mirror having one of a parabolic, non-parabolic, conical, or aspherical surface; a convex secondary mirror facing the primary mirror, the secondary mirror having a hyperbolic surface, where an optical axis extends from a vertex of the primary mirror to a vertex of the secondary mirror; a concave tertiary mirror arranged behind the primary mirror, the tertiary mirror having one of a parabolic, non-parabolic, conical and aspherical surface; a concave quaternary mirror arranged in front of the central aperture of the primary mirror, the quaternary mirror having one of a spherical, parabolic, non-parabolic, conical or aspherical surface; and at least one image plane having one or more aggregated sensors, wherein the image plane is positioned at a radial distance from the optical axis that is no more than the radius of the primary mirror.

BRIEF DESCRIPTION OF THE DRAWINGS

Elements in the figures have not necessarily been drawn to scale in order to enhance their clarity and improve understanding of these various elements and embodiments described herein. Furthermore, elements that are known to be common and well understood to those in the industry are not depicted in order to provide a clear view of the various embodiments described herein, thus the drawings are generalized in form in the interest of clarity and conciseness.

DETAILED DESCRIPTION OF CERTAIN EMBODIMENTS

In the following discussion that addresses a number of embodiments and applications, reference is made to the accompanying drawings that form a part hereof, and in which is shown by way of illustration specific embodiments in which the embodiments described herein may be practiced. It is to be understood that other embodiments may be utilized, and changes may be made without departing from the scope of the disclosure.

Various inventive features are described below that can each be used independently of one another or in combination with another feature or features. However, any single inventive feature may not address all of the problems discussed above or only address one of the problems discussed above. Further, one or more of the problems discussed above may not be fully addressed by the features of each embodiment described below.

Figure 1A:
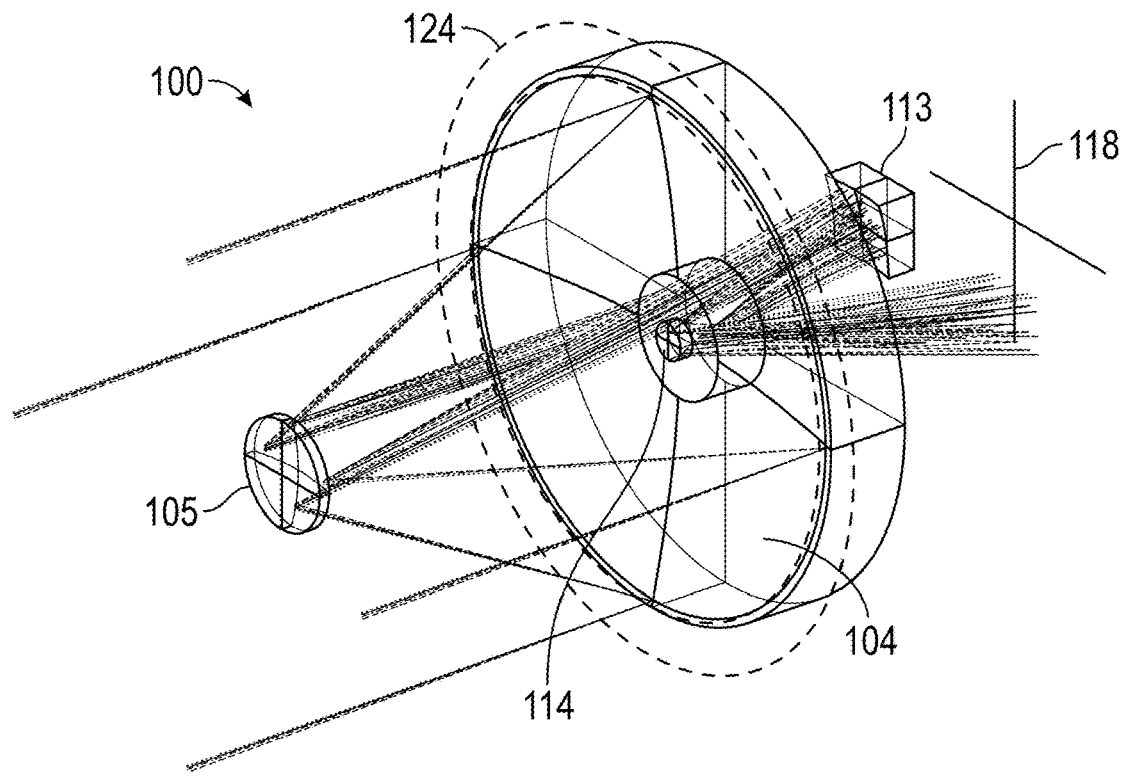
FIGS. 1A and 1B are schematics of an embodiment of an optical system that may be used for imaging.

Described herein are embodiments of small volume, high resolution optical imaging systems and methods that can be used in satellites and other aerial systems. An optical system 100 is shown in FIG. 1A and is one embodiment that may be used for providing high resolution imaging performance in a "micro" or small form factor (volumetric envelope). The optical systems may "piggyback" on other missions with existing high bandwidth capabilities.

A constellation of satellites in orbit may operate in collaboration with each other for coordinated ground coverage. The orbits of the satellites in the constellation may be synchronized. For example, the orbits may be geostationary, where the satellites may have orbital periods equal to the average rotational period of Earth and in the same direction of rotation as Earth. Or the orbits may be sun-synchronous, such as a nearly polar orbit around Earth, in which the satellite passes over any given point of the Earth's surface at the same local mean solar time or the orbit precesses through one complete revolution each year so it always maintains the same relationship with the Sun. Synchronous systems introduce complexity by requiring dedicated platforms and sensors, launchers, and operation stations. For remote sensing, typical examples of such synchronized constellations include the programs of PLANETSCOPE (a.k.a. DOVE), SKYSAT, BLACKSKY, and CARBONITE.

The systems described herein may be used in systems in synchronous as well as asynchronous orbits. Thus, in some embodiments, the imaging systems may be used with an Asynchronous Constellation of Earth observation Camera system (ACEC). This is especially true for constellations of many small satellites, such as CUBESATs, and also with Low-Earth Orbit (LEO) broadband data relay satellite constellations, such as Space NGSO Satellite System, One Web, and Amazon's KUIPER System. Any of the optical systems or features thereof described herein may include any of the features of the micro optical and camera systems and other aspects described in "Study on the feasibility of micro camera systems for asynchronous, gigantic satellite constellation", by Youngwan Choi, Proc. SPIE 11127, Earth Observing Systems XXIV, 111270Z (9 Sep. 2019, available at https://doi.org/10.1117/12.2529090), the entire contents of which are incorporated by reference herein in their entirety.

An asynchronous constellation may include camera systems onboard any available platforms, which have planned missions but can host additional payloads. It may be different from the nominal constellation in the sense that it will not be operated synchronously and not provide coordinated ground coverage with the sole purpose of only providing a stream of images. The most significant benefit of the asynchronous constellation is to avoid or minimize cost, time, and effort to develop a platform, require a specific launch system, and operate a dedicated ground control system, which can be a large fixed cost. An advantage of leveraging LEO broadband data relay satellites for asynchronous constellation imaging is its broad data bandwidth. CUBESATs or other platforms with dedicated imaging or other missions may suffer from decreased data bandwidth. Free from the data bandwidth issue, asynchronous constellation with the LEO data relay satellites can stream image data in dedicated channels as the satellites stream movies or other content so that users can selectively receive, record, and process image data.

To do this, much smaller or micro camera systems that have dimensional advantages and can accommodate themselves to any available space are needed. Recent developments of smaller cameras focuses on dimensional advantages only so that such development relies on optical designs that are easier to design, simpler to develop, or cheaper to build. However, such an approach may seem reasonable but may put a limit or constraint on leveraging such cameras for serious missions due to decreased performance, such as optical resolution.

The optical system 100 and the other embodiments of imaging systems described herein may be used for constellation operations and be micro in physical dimension as well as be advanced in performance. Systems and methods for a 4-mirror telescope in a small form factor are described.

The embodiments described herein may be onboard satellite platforms that are already planned, as a secondary payload or an additional system. In some embodiments, the imaging system may have a size on the scale of a star sensor or tracker. The imaging system may be lightweight. The imaging system may minimize power consumption. The imaging system and its interface to a platform may be simple so that it can be installed and operated easily. The imaging system may be capable of proper imaging, which may be described by its specification. The imaging system may have proper MTF values. The imaging system may be designed to operate over a wide spectral range and equipped with a number of channels over the spectral range, with panchromatic, red, green, blue, and near infrared as a baseline set. The imaging system may be capable of a large field of view.

For such a camera system, an important requirement is distortion property. A camera system with a small f-number, a small aperture with a longer effective focal length for higher resolution, may need a time-delay-integration (TDI) sensor to achieve a proper signal-to-noise ratio (SNR) for further processing on the ground. Distortions induced by optical design can cause smear in the camera system. To avoid a significant degradation of image quality for TDI imaging, distortions induced by the system should be minimized over an entire field-of-view (FOV).

The optical imaging systems described herein are based on a reflective or mirror system, which may be unusual for a small form, affordable system. Usual cameras for CAN- or NANO-SAT are based on a cata-dioptric design for its design simplicity and cost reduction. The examples are PLANETSCOPE (a.k.a. DOVE), SKYSAT, BLACKSKY, and CARBONITE.

The design of the SKYSAT camera is based on a Ritchey-Cassegrain telescope, which has two mirrors (primary and secondary) and a small number of lenses. It is known for easy manufacturing, cost reduction, and simple alignment/assembly logic. Also, it utilized COTS frame CMOS sensors. The CARBONITE camera is an example of commercially available, off-the-shelf astronomical telescope, which is modified to be accommodated to space environment, and equipped with a commercial CMOS sensor for color video imaging. Utilizing a commercial telescope seemed to be a smart move in a sense that development or manufacturing effort can be reduced, cost can be cut seriously, and operation management can be efficient. Whole processes were developed suitable for implementing constellation of Earth observation satellites.

Different from those approaches, the optical system embodiments described herein for cameras are based on a reflective design that is a four-mirror system. The optical system described herein may have no limit of spectral range to be covered. The system may have no chromatic aberration, which can be critical for multispectral imaging. The system may have high design flexibility due to degree of freedom of multi-mirror system. The system may have mass reduction deduced by mirror light-weighting. The system may have a small form factor.

Figure 1B:
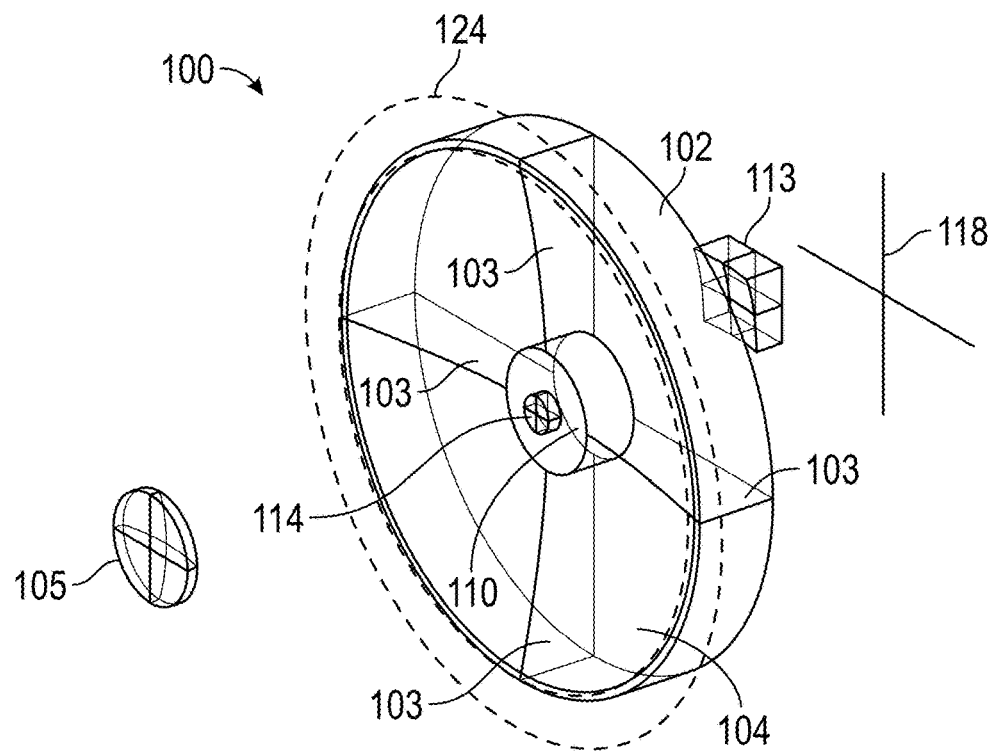
Figure 1C:
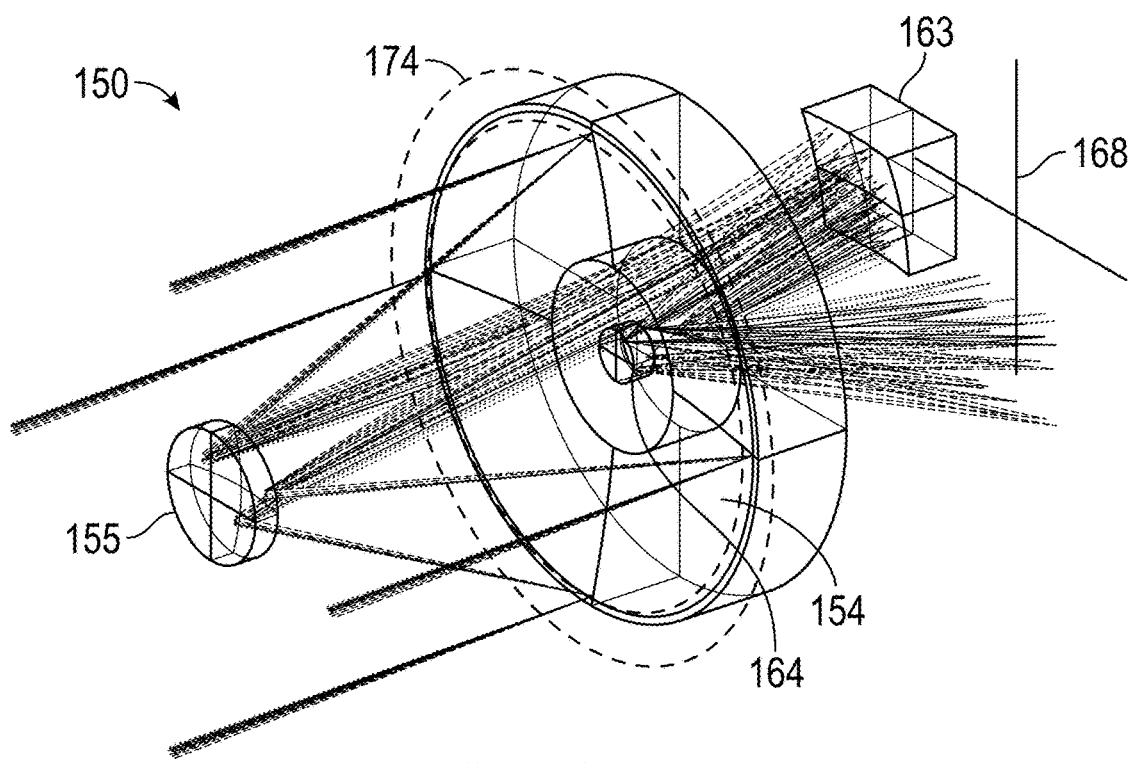
FIGS. 1C and 1D are schematics of another embodiment of an optical system that may be used for imaging.
Figure 1D:
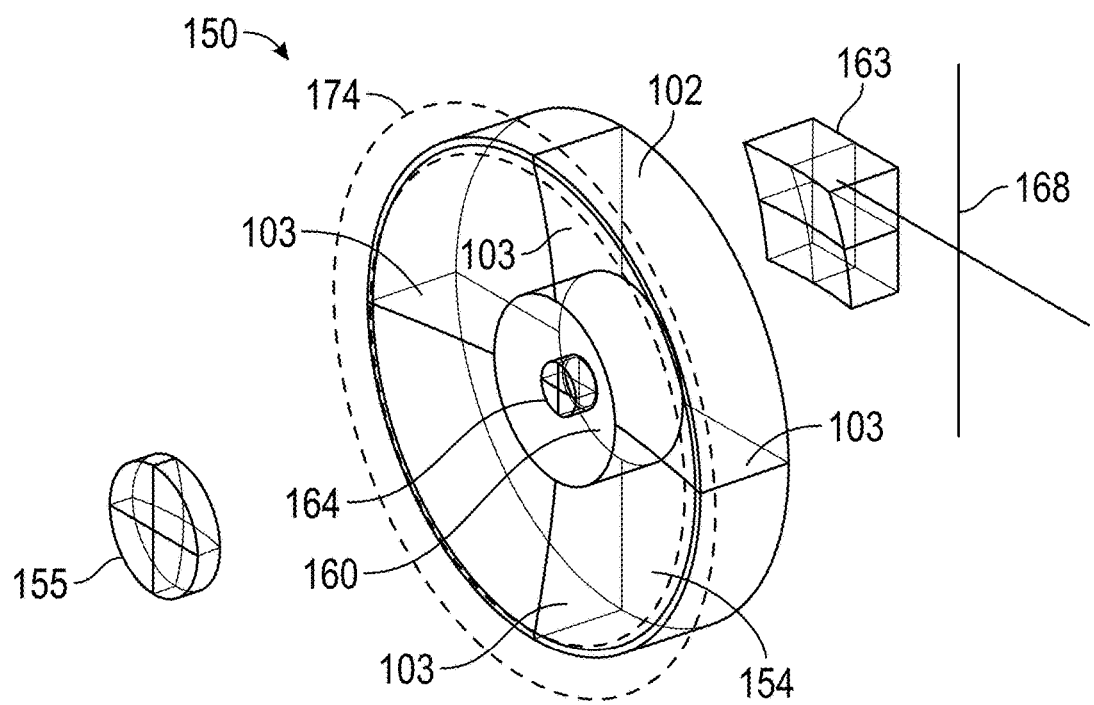

FIG. 1A is a perspective schematic view of an optical layout of a first optical system 100 showing optical path lines. FIG. 1B is a perspective schematic view of the optical system 100 without the optical path lines shown for clarity. The optical lines may be indicative of multiple spectral bands. Referring to FIG. 1C, a perspective view of an optical layout of a second optical system 150 showing optical lines is illustrated. FIG. 1D shows the optical system 150 without the optical lines for clarity.

The first two mirrors of the optical systems 100, 150, a primary mirror 104 and a secondary mirror 105 in FIGS. 1A and 1B, and a primary mirror 154 and a secondary mirror 155 in FIGS. 1C and 1D, are responsible for power of the systems so that it can determine its effective focal length or resolution. "Effective focal length" as used herein has its usual and customary meaning, and includes without limitation the distance from a principal plane of an optical mirror to an imaging plane 118, 168. Entrance pupil 124 of the optical system 100 (shown in FIGS. 1A and 1B), and entrance pupil 174 of the optical system 150 (shown in FIGS. 1C and 1D), control the amount of light through the respective systems, and may be located at the respective primary mirrors. The entrance pupil may be the optical image of the physical aperture stop, as seen through the front (the object side) of the optical system. The corresponding image of the aperture as seen through the back of the optical system is called the exit pupil.

The primary mirrors 104, 154 may be supported by a structural support 102 having radially extending beam 103 to support the mirror structure. The structure 102 and beams 103 may minimize the distortion on the primary mirror surface that may be induced by bonding and thermal environmental change. Also, it may protect the primary mirror from random vibration and shock that the camera may experience during launch.

In some embodiments, the various mirrors and supporting structures for any of the optical systems described herein may be formed of aluminum, ceramics, designed composite materials, other suitable materials, or combinations thereof. In some embodiments, the one or more structures and/or the one or more mirrors can be manufactured by 3D printing technology also known as additive manufacturing technology. For example, the mirrors and the supporting structure may all be additively manufactured as one monolithic piece.

A tertiary mirror 113 in FIGS. 1A and 1B, and a tertiary mirror 163 in FIGS. 1C and 1D, contribute to widening a field of view (FOV) and corrects corresponding residual optical aberrations. The tertiary mirrors 113, 163 may not include an optical axis, for example for simpler manufacturability, and two or more tertiary mirrors may be manufactured from one base piece. A quaternary mirror 114 in FIGS. 1A and 1B, and a quaternary mirror 164 in FIGS. 1C and 1D, may minimize distortion and control a back focal length. "Back focal length" as used herein has it usual and customary meaning, and incudes without limitation the distance between the last surface of an optical mirror to its image plane. The fields of view of the optical systems 100, 150 are designed so that the rays do not interfere with the respective quaternary mirror and the central aperture of the respective primary mirror. The quaternary mirrors 114, 164 reflect the respective light along the optical path to the imaging plane 118, 168.

FIG. 1D shows the second optical system 150 but without showing the optical path lines for clarity. The diameter of the aperture or central hole 110 in FIG. 1B and 160 in FIG. 1D is minimized to maximize the use area of the primary mirror and in some embodiments is not larger than the corresponding secondary mirror 105, 155. The diameter of the central hole 110 in FIG. 1B and hole 160 in FIG. 1D may be designed large enough to not interfere with the light rays travelling through the central holes 110 and 160.

Figure 1E:
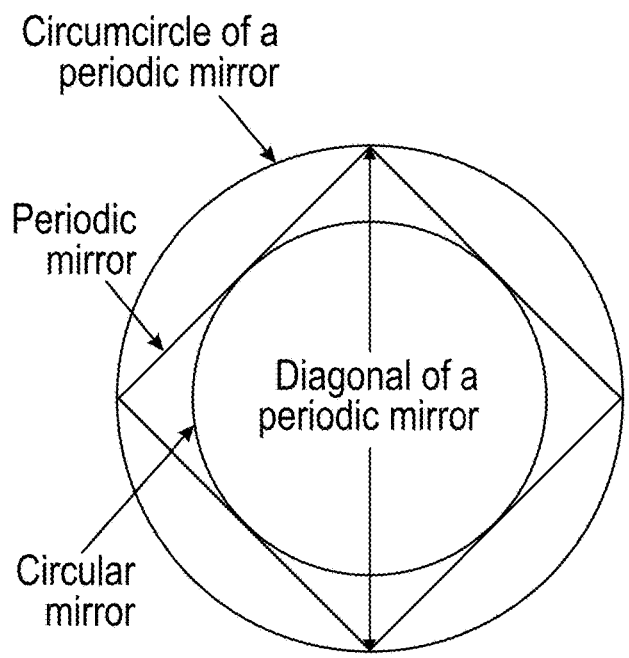
FIGS. 1E and 1F are schematics showing diagonals for respectively a periodic mirror and an image plane.
Figure 1F:
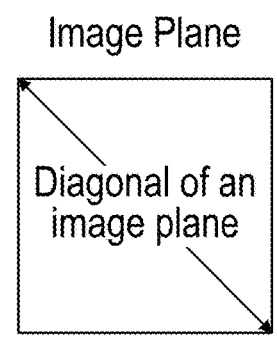

The primary mirrors 104, 154 and/or the secondary mirrors 105, 155 may be symmetric or periodic about the respective optical axis. FIGS. 1E and 1F are schematics showing diagonals for respectively a periodic mirror and an image plane. The diagonal of a periodic mirror may have an angle of zero degrees or 45 degrees from a diagonal of the image plane. The optical axis of the tertiary mirror may not coincide with a mechanical axis.

Figure 1G:
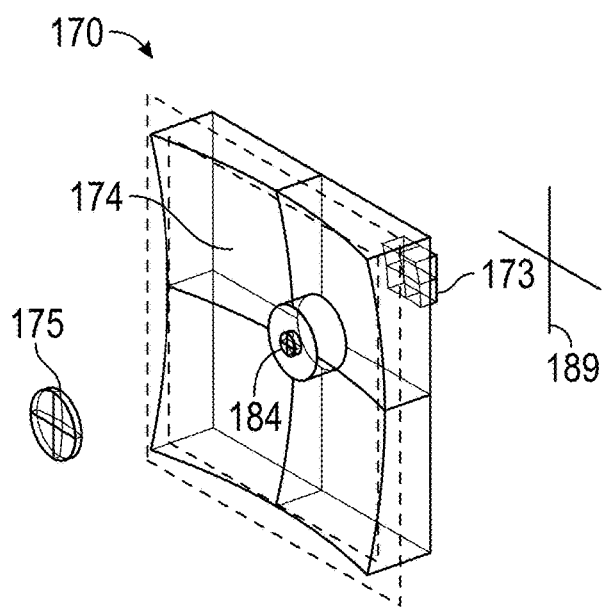
FIGS. 1G and 1H show example embodiments of optical systems having a periodic primary mirror.
Figure 1H:
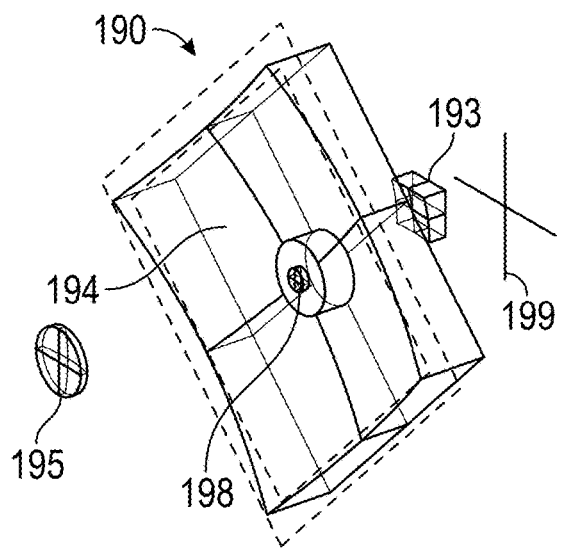

FIGS. 1G and 1H show example embodiments of optical systems 170, 190 respectively having a periodic primary mirror 174, 194. The optical systems 170, 190 further include, respectively, a secondary mirror 175, 195, a tertiary mirror 173, 193, a quaternary mirror 184, 198 and an imaging plane 189, 199. The optical systems 170, 190 may have the same or similar features and/or functions as the optical systems 100 or 150.

The optical systems 100, 150 may include any of the same or similar features and/or functions as the other embodiments of optical systems described herein, and vice versa. For example, the optical systems 100, 150 may include any of the same or similar features and/or functions as optical systems 210, 300, 400, 500, 600, 700, 800, 900, 1000, 1100, 1200, 1300, 1430, 1460, and vice versa. For example, for any of the optical systems described herein, the primary mirror may be concave and have a central aperture.

The primary mirror may have a parabolic surface, a non-parabolic conical surface, or an aspherical surface. A "parabolic surface" as used herein has its usual and customary meaning, and includes, without limitation, a reflective surface used to collect the light energy and may have a shape that is part of a circular paraboloid, that is, the surface generated by a parabola revolving around its axis. A "non-parabolic conical surface" as used herein has its usual and customary meaning, and includes, without limitation, a curve rotated about its axis where the curve is obtained as the intersection of the surface of a cone with a plane other than a parabola. For example, the "non-parabolic conical surface" may be hyperbolic, elliptical, or circular. An "aspherical surface" as used herein has its usual and customary meaning, and includes, without limitation, a surface that is not spherical. In some embodiments, a spherical surface may be slightly altered so as to reduce spherical aberration.

Figure 3:
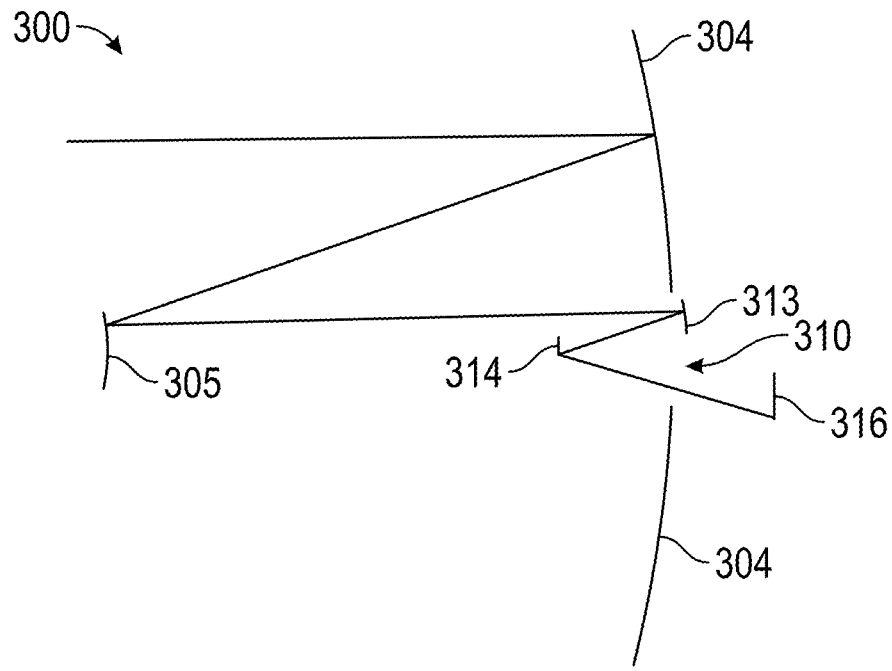
FIGS. 3-5 are schematics showing various embodiments of configuration layouts for mirrors and an imaging plane that may be used with the various optical systems described herein.

The secondary mirror may be convex and face the primary mirror. The secondary mirror may have an aspherical surface. The tertiary mirror may be concave and arranged behind the primary mirror. "Behind" may refer to a side of the primary mirror that is opposite the side of the primary mirror that reflects incoming light to the secondary mirror. The tertiary mirror may have a parabolic surface, a non-parabolic conical surface, or an aspherical surface. The quaternary mirror may be concave and arranged in the central aperture of the primary mirror, before the primary mirror or behind the primary mirror, for example as shown in FIG. 3. The quaternary mirror may have one of a spherical surface, a parabolic surface, a non-parabolic conical surface, or an aspherical surface.

There may be at least one image plane having one or more aggregated sensors, where the image plane is positioned at a specific distance from an optical axis. The optical axis may be defined as a geometric reference line extending between the vertices of the primary and secondary mirrors. The vertex for a given mirror may be a point on the mirror's surface where the principal axis meets the mirror.

The optical system 100 may have a larger primary mirror 104 and thus higher resolution relative to the primary mirror 154 of the optical system 150. The resolution of the optical system 100 may be better than 1 m at 500 km altitude. The optical system 150 may have a resolution of better than 2 m at 500 km altitude. The optical system 150 may have a larger field of view (FOV) than the optical system 100. The optical system 100 may have a narrower field of view (FOV) relative to the optical system 150. The optical system 100 may have volumetric dimensions of 200 mm (W)×200 mm (H)×250 mm (L). The optical system 150 may have volumetric dimensions of 100 mm (W)×100 mm (H)×150 mm (L). The optical system 150 may be lighter in weight than the optical system 100. The optical systems 100, 150 may both have a proper MTF for higher resolution imaging.

Both the optical systems 100, 150 may have similar mirror types and optical paths. But their respective purposes and missions may be different. The purpose of the optical system 100 may be to map the surface of the Earth and acquire geospatial data. The purpose of the optical system 150 may be for remote sensing and environmental monitoring.

In some embodiments, the optical systems 100, 150 may achieve various parameters for orbital systems and/or imaging systems. Example parameters achievable with the optical systems 100, 150 are described in Table 1. For example, the design orbit may be set to 500 km, the spectral bands may be designed to be compatible with big satellites and scientific satellite imaging except the panchromatic band, etc. The panchromatic band (PAN band) may be designed to include up to red-edge, improving Modulation Transfer Function (MTF) in the band, which may be unavoidable due to its small aperture size.

TABLE 1

| Design Parameters | Optical System 100 | Optical System 150 |
|---|---|---|
| Orbit Altitude (km) | 500 | 500 |
| Ground Sample Distance (GSD, m) | ≤1 | ≤2 |
| Spectral Range (nm) | | |
| PAN band | 450~720 | 450~720 |
| NIR band | 770~890 | 770~890 |
| Red band | 630~690 | 630~690 |
| Green band | 520~590 | 520~590 |
| Blue band | 450~520 | 450~520 |
| Pixel size (μm) | 5 | 5 |
| Number of active pixels | ≤12000 | ≤8000 |
| Size of Clear Aperture (mm × mm) | ≤200 × 200 | ≤100 × 100 |
| Time-Delay-Integration (TDI) steps of Backside-Illumination (BSI) sensor | 128 | 128 |

Figure 2A:
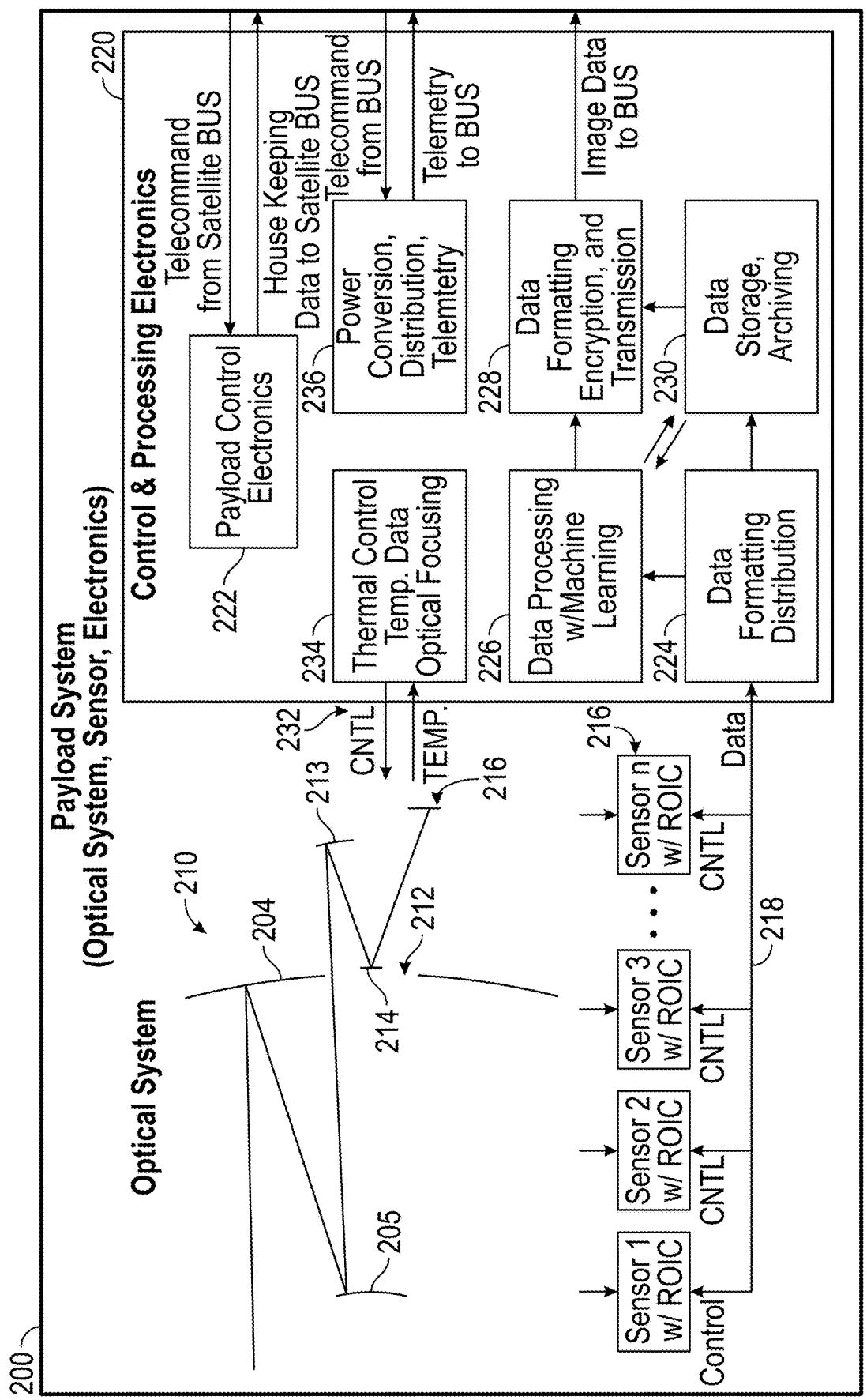
FIG. 2A is a block diagram showing a schematic of an embodiment of a payload system for a satellite that may include the various optical systems described herein.

FIG. 2A is a block diagram of an example payload system 200 configuration for an optical system 210 in a satellite. The optical system 210 is shown in schematic form. The optical system 210 includes a concave primary mirror 204 having a central aperture 212. The primary mirror may have one of parabolic, non-parabolic conical or aspherical surface. A smaller convex secondary mirror 205 faces the primary mirror 204 and has an aspherical surface. The secondary mirror may have an aspherical surface. A concave tertiary mirror 213 is arranged behind the primary mirror 204. The tertiary mirror may have one of parabolic, non-parabolic conical or aspherical surface. A concave quaternary mirror 214 is arranged slightly behind the central aperture 212 of the primary mirror 204, where the quaternary mirror can have one of a spherical, parabolic, non-parabolic conical or aspherical surface. The primary mirror 204, the tertiary mirror 213 and the quaternary mirror 214 each have positive power or focal length, and the secondary mirror 205 has negative power. "Behind" may be defined as described above. Behind may also refer to a direction in FIG. 2A as oriented that is to the right, such that "behind" the primary mirror 204 may mean to the right of the primary mirror 204 as oriented in the figure.

An image sensor 216 having up to 'n' aggregated sensors that convert light into electrical signals is positioned behind the primary mirror 204. In certain embodiments, the image sensor 216 may deliver an output format of thirty-two sub-LVDS (low-voltage differential signaling) channels of digital data across an interface 218 to a control and processing electronics portion 220 of the satellite. In other embodiments, other output formats are used. The sensor 216 includes a readout integrated circuit (ROIC) used for infrared, visible, and other arrayed sensors. The functions supported by the ROIC include processing and shaping of an image signal and may include unit cell preamplifiers. Interface 218 also includes control signals from the control and processing electronics 220, where the control signals may include a serial peripheral interface (SPI) and a clock signal in some embodiments.

In certain embodiments, a data formatting and distribution subsystem 224 receives the data across the interface 218 and then further sends the data to a data processing with machine learning subsystem 226 and to a data storage and archiving subsystem 230 to be stored. The stored data from the data storage and archiving subsystem 230 can be sent directly to the data processing subsystem 226 for various types of processing. The output of processed data from the data processing subsystem 226 can be sent directly to the data storage and archiving subsystem 230 for storage. The output of processed data from the data processing subsystem 226 and data from the data storage and archiving subsystem 230 can be sent to a data formatting, encryption and transmission subsystem 228. The output of the data formatting, encryption and transmission subsystem 228, such as image data, is then sent to a satellite Bus for further distribution, which may include transmission to an earth station, relay satellite, or other entity that receives the data. The data processing subsystem 226 may include one or processors and one or more memories, such as a memory for program instructions and a memory and/or a cache for data.

A payload control electronics subsystem 222 receives telecommands from the satellite Bus and provides housekeeping data to the satellite Bus. The payload control electronics subsystem 222 provides commands to portions of the payload system 200, including to the image sensor 216 and/or to a thermal control, temperature data and optical focusing subsystem 234. The thermal control, temperature data and optical focusing subsystem 234 provides control signals, such as thermal control and optical focusing, via an interface 232 to the optical system 210 and receives temperature data back from the optical system 210.

A power conversion, distribution and telemetry subsystem 236 receives telecommands from the satellite Bus and provides telemetry data to the satellite Bus. The power conversion, distribution and telemetry subsystem 236 may also receive power, such as from solar panels or batteries of the satellite.

An important issue with imaging systems for smaller satellites, such as CUBESATs, is calibration, including absolute and inter-sensor calibrations. Most imagery from commercial CUBESATs is not calibrated in a standard way on a standard radiance or reflectance scale, for example. Thus, it may be challenging to compare the image data with big commercial satellites or scientific satellites imaging, like MODIS or LANDSAT. Even inter-sensor calibration is uncertain, which may owe mainly to temporarily unstable or inconsistent performance of commercial sensors.

On the contrary, the sensors for the optical systems described herein, such as the aggregate sensor of the sensor 216 in optical system 210, may be developed and tailored to space applications and their consistency and stability may be validated. Importantly, the optical system 210 and all the optical systems described herein may be calibrated according to the standard processes and with respect to each other so that all the image data from the systems is compatible with each other and also with reference systems.

Figure 2B:
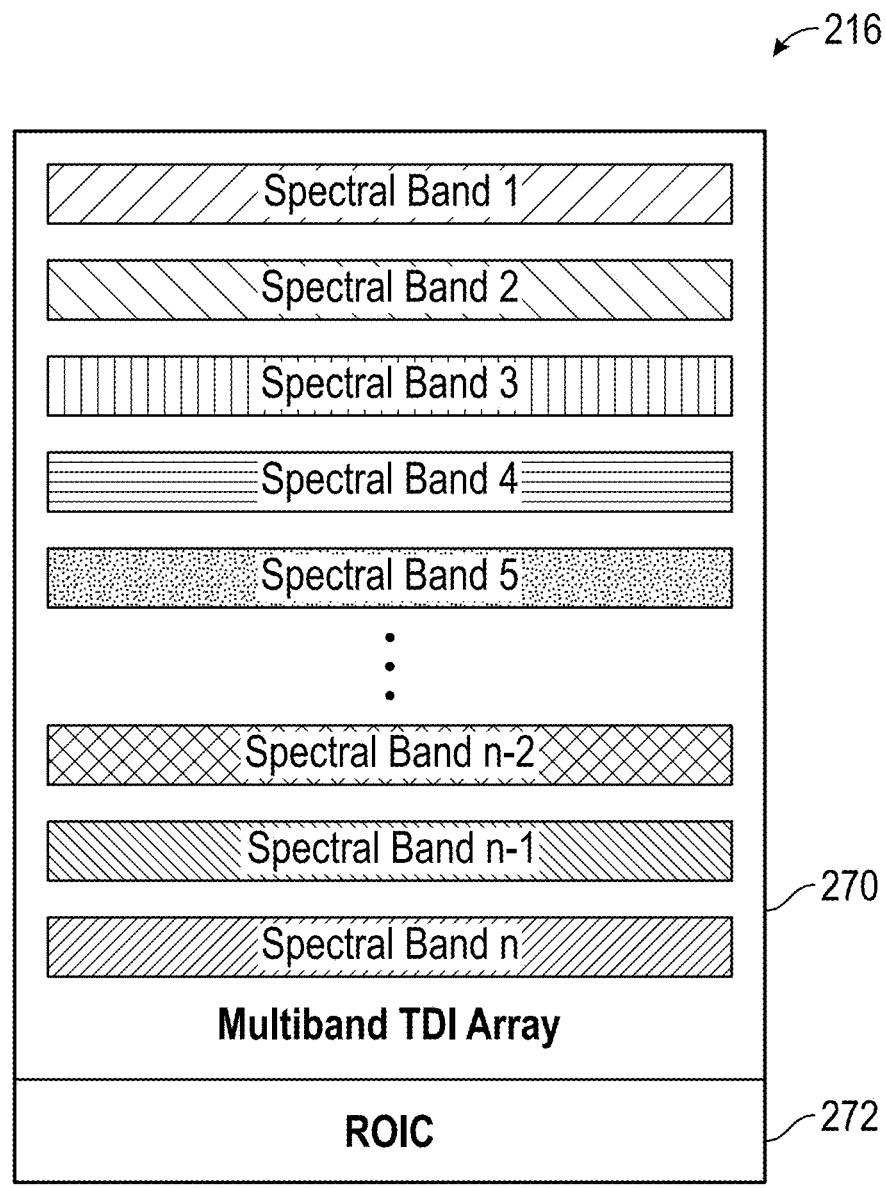
FIG. 2B is block diagram showing a schematic of an embodiment of an image plane circuit that may be used with the various optical systems described herein.

Referring to FIG. 2B, an example embodiment of a sensor circuit for the image sensor 216 is shown. The image sensor 216 may include a readout integrated circuit (ROIC) 272 and a charged coupling device (CCD) array 270. Photons incident on the surface of the CCD array 270 (top surface as oriented in the figure) generate a charge that can be read by electronics and turned into a digital copy of the light patterns falling on the device. In certain embodiments, a charge coupled device in complementary metal-oxide-semiconductor (CCD-in-CMOS) time delay integration (TDI) sensor from IMEC International may be used for the optical system 210, even though a pixel size of 5 micrometers (μm) is preferred. In some embodiments, using a format of 4096 columns and 256 stages per multiband CCD array 270, a backside illumination sensor combines a TDI CCD array with CMOS drivers and readout pixels on a pitch of 5.4 μm. An on-chip control and sequencer circuit may be included. In certain embodiments, a 130 MHz clock 262 may be an input to the image sensor along with a serial peripheral interface (SPI) for control. The imager may interface through the SPI and may integrate on-chip PLLs to deliver an output format of 32 sub-LVDS (low-voltage differential signaling) channels as part of the ROIC 272. A seven-band version of the circuit can contain seven CCD arrays of 4096×256 pixels each.

In other embodiments, other sensor circuits may be used for the image sensor 216, which may have differing sizes of the array 270 and a different ROIC 272 for the output of data. For example, the image sensor 216 may include four panchromatic CCD arrays of 16384×96 pixels each and eight multispectral CCD arrays of 8192×48 pixels.

To maximize the area that is exposed to light, backside illumination technology can be used. This consists of bonding the sensor wafer to a carrier wafer and thinning it from the backside. This directly exposes the CCD gates to the light, without obstruction of metal lines. An effective fill factor thus reaches 100% percent. Backside illuminated CMOS imagers feature a very high intrinsic light sensitivity and are very efficient in detecting (near) ultraviolet and blue light. Several antireflective coatings (ARCs) are available to reach a high quantum efficiency in selected regions of the spectrum, e.g. more than 70% in the UV range or more than 90% in the visible range.

With a TDI sensor, image quality is sensitive to platform motion, which can be represented by image smear MTF. The image smear MTF of the optical system 210 may be 0.974 with smearing of 0.2 pixels, the number of TDI steps at 128, and a clocking phase of 4. This may impose requirements of attitude stability of the platform, which may be twenty-two micro-radians per second (wad/sec) or 4.54 arcseconds per second (arcsec/sec). When the attitude stability requirement is relaxed to smearing of one pixel, then the smear MTF becomes 0.75 and the stability may be 23 arcsec/sec.

Referring to FIG. 3, a schematic of an embodiment of an all-reflective optical system 300 is shown. The optical design of the optical system 300 may be different from a traditional Three Mirror Anastigmat TMA or three mirror Korsch design. The Korsch design may have an ellipsoid surface for the primary mirror, a hyperbola surface for the secondary mirror, and an ellipsoid surface for the tertiary mirror.

The optical system 300 includes a concave primary mirror 304 having a central aperture 310, where the primary mirror can have one of a parabolic, non-parabolic conical, or aspherical surface. A smaller convex secondary mirror 305 faces the primary mirror 304 and has an aspherical surface. A concave tertiary mirror 313 is arranged behind the primary mirror 304, where the tertiary mirror can have one of a parabolic, non-parabolic conical or aspherical surface. A concave quaternary mirror 314 is arranged in front of the central aperture 310 of the primary mirror 304, where the quaternary mirror can have one of a spherical, parabolic, non-parabolic conical or aspherical surface. The primary mirror 304, the tertiary mirror 313 and the quaternary mirror 314 each have positive power or focal length, and the secondary mirror 305 has negative power.

An image plane 316 having one or more aggregated sensors that convert light into electrical signals is positioned behind the primary mirror 304. In certain embodiments, the image plane 316 is positioned at a specific distance from an optical axis that is defined by a mechanical symmetry around a line through the vertices of the primary and the secondary mirrors, which may define the "optical axis." The specific distance is within the physical radius (from the optical axis) of the primary mirror. Thus, the image plane will not exceed a cylindrical envelope that is defined by the radius from the optical axis of the primary mirror. The radius of the primary mirror may extend perpendicularly from the principal axis of the mirror to an outermost edge of the mirror. The principal axis may be a geometric reference line going through the center of the mirror that is exactly perpendicular to the surface of the mirror.

The optical system 300 uses the secondary mirror 305 that is symmetric around the optical axis. The tertiary mirror 313 can have a segmented non-circular shape. The quaternary mirror 314 can have a circular or non-circular shape. The primary mirror 304 can have a circular or a non-circular shape, where the latter is to enhance modulation transfer function (MTF) and signal to noise ratio (SNR). A circular shape is inscribed to a non-circular shape, which may be periodic about the optical axis.

For an example of a square and its incircle, the incircle may be the shape of a primary mirror for traditional optical system design. If the radius of the incircle is "r," then the area of the square will be larger by 4/pi. This is not usually an issue for a larger camera for which a large volume is allocated. However, for a small satellite, which is usually a cuboid, a primary mirror in a square shape can have a larger area by 4/pi and boost MTF and SNR.

Both Korsch and other four-mirror optical designs do not use a parabolic surface for the primary and/or the tertiary mirrors. With the primary and/or the tertiary mirrors of the optical system 300 having a parabolic surface, the optical system 300 can provide a unique, affordable solution to a mission with budget constraints. For a parabolic surface, a general test setup can be used for manufacturing, or a stitching measurement is possible. Also, a commercial product line can be used for parabolic mirror manufacturing, especially when mirrors are smaller than 300 mm. In contrast, non-parabolic conic or aspherical surface may require a dedicated test tool, including computer generated hologram (CGH) or nulling optics.

For a parabolic surface, a general test setup can be used for manufacturing, or stitching measurement is possible. Also, a commercial product line can be used for parabolic mirror manufacturing, especially, when mirrors are smaller than 300 mm.

The primary and the secondary mirrors 304, 305 forming the optical axis are symmetric or periodic about this axis. The primary and secondary mirrors face each other. The tertiary mirror 313 faces the back of the primary mirror 304 and may be a segmented mirror. As used herein, "segmented mirror" includes its usual and customary meaning and includes, without limitation, an array of smaller mirrors designed to act as segments of a single, larger curved mirror. The optical axis of the tertiary mirror 313 may not coincide with a mechanical axis. As used herein, the "mechanical axis" has its usual and customary meaning, and may includes, without limitation, a normal vector at the center or at the edge of the mirror. In certain embodiments, the tertiary mirror 313 is a segment of a larger mirror. In such embodiments, the optical axis for the tertiary mirror 313 may refer to the optical axis of the larger mirror and the mechanical axis may refer to the axis of the segmented mirror. The quaternary mirror 314 faces the tertiary mirror 313 and is positioned to avoid interference with rays from the secondary mirror 305 to the tertiary mirror 313.

The metering and supporting structure of the mirrors can be a cylindrical tube or a conical baffle of the primary mirror 304, such as those shown and described with respect to FIGS. 14A-14D. The cylindrical envelope may be coextensive with a cylindrical structure to limit the specific distance at which the imaging plane is located relative to the optical axis between the primary and secondary mirrors. For example, the location of the imaging plane may be radially limited by the radius of the cylindrical structure.

Light rays impinge upon and are reflected by the primary mirror 304 first, the secondary mirror 305 next, the tertiary mirror 313 thirdly, and finally the quaternary mirror 314, so that the rays reach the image plane 316. The image plane 316 includes one or more sensors, which may be aggregated in an orderly manner. An entrance pupil of the optical system 300 can be positioned near the primary or the secondary mirrors 304, 305. An intermediate focus is formed around a vertex of the primary mirror 304, positioned between the primary and the secondary mirrors 304, 305, or between the primary mirror 304 and the tertiary mirror 313. An exit pupil or Lyot stop can be positioned near the quaternary mirror 314, between the tertiary and the quaternary mirrors 313, 314, or between the quaternary mirror 314 and the image plane 316. As used herein, a "Lyot stop" has its usual and customary meaning and includes, without limitation, an optical stop that reduces the amount of flare which may be caused by diffraction of other stops and baffles in the optical system. The Lyot stops may be located at images of the system's entrance pupil and have a diameter slightly smaller than the pupil's image.

The optical system 300 has a small form factor. The form factor is defined as the ratio of 1) a distance between the secondary and tertiary mirrors 305, 313 to 2) an effective focal length of the optical system 300. The optical system 300 has a form factor of less than 0.2 and of 0.09 in some embodiments. The form factor may be from about 0.09 to 0.2, from about 0.04 to less than 0.25. The form factor may be less than 0.25. The form factor may have the following values or about the following values: 0.02, 0.03, 0.04, 0.05, 0.06, 0.07, 0.08, 0.09, 0.010, 0.11, 0.12, 0.13, 0.14, 0.15, 0.16, 0.17, 0.18, 0.19, 0.20, 0.21, 0.22, 0.23, 0.24 or 0.25. The form factor may be less than 0.04, less than 0.05, less than 0.06, less than 0.07, less than 0.08, less than 0.09, less than 0.010, less than 0.11, less than 0.12, less than 0.13, less than 0.14, less than 0.15, less than 0.16, less than 0.17, less than 0.18, less than 0.19, less than 0.20, less than 0.21, less than 0.22, less than 0.23, less than 0.24, or less than 0.25.

In addition to the small form factor, the optical system 300 has a benefit over the prior art in having a much shorter physical distance from the tertiary mirror 313 to the image plane 316. The prior art has quite a long distance between the tertiary mirror and image plane and mandates one or more folding mirrors to fit into a limited dimension. This configuration may lead to difficulty in optical alignment, thermal instability during operation, which may end with performance degradation. The optical system 300, because of the small form factor and the short distance between the tertiary mirror 313 and the image plane 316, eliminates unnecessary folding mirrors and simplifies the alignment and assembly and stability of operation.

The optical system can be designed to have mirrors of zero coefficient of thermal expansion (CTE) materials (such as Zerodur, Fused Silica, Suprasil, Astrostiall, etc.), low-CTE materials (such as Borosilicate glass, like BOROFLOAT, Pyrex, etc.), and mild-CTE materials (such as Crown glass, like NBK7).

For CTE matching, a specific combination of mirror and structure materials are used for the optical system. Superinvar, invar, or designed composite material can be used for zero-CTE mirror materials. Invar, Kovar, ceramics, or designed composite material can be used for low-CTE mirror materials. Titanium, ceramics, or design composite materials can be used for mild-CTE mirror materials.

A monolithic structure can be used for the optical system as an ultimate solution. Mirrors and structures can be made of one material, including aluminum, ceramics, designed composite materials, and is not limited to this list.

Figure 4:
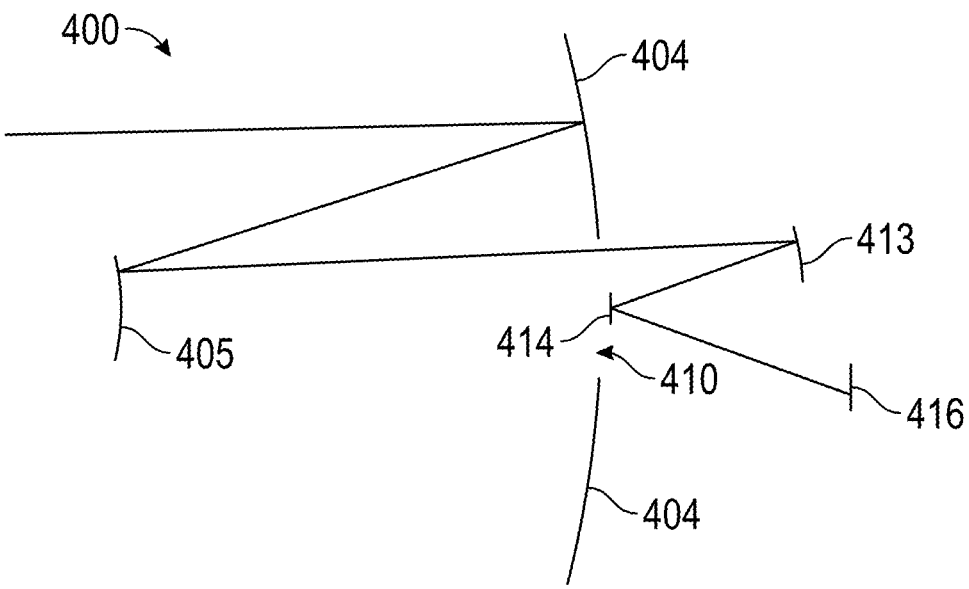

Referring to FIG. 4, a schematic of another embodiment of an all-reflective optical system 400 is shown. The optical system 400 includes a primary mirror 404, a secondary mirror 405, a tertiary mirror 413, a quaternary mirror 414, and image plane 416. The primary mirror 404, secondary mirror 405, tertiary mirror 413, the quaternary mirror 414 and image plane 416 may have the same or similar features and/or functions as, respectively, the primary mirror 304, the secondary mirror 305, the tertiary mirror 313, the quaternary mirror 314 and image plane 316 of the optical system 300, and vice versa.

However, in the optical system 400, the quaternary mirror 414 is located behind the primary mirror 404, but close to an aperture 410 in the primary mirror 404. The tertiary mirror 413 is positioned further behind the primary mirror 404 in the optical system 400 than in the optical system 300. In certain embodiments, the tertiary mirror 413 may be positioned a distance behind the primary mirror 404 that is in a range of 20% to 60%, of 30% to 50%, or of 35% to 45%, of the diameter of the primary mirror 404. The primary mirror 404 of the optical system 300 in FIG. 3 can be manufactured in one body with the tertiary mirror 313 so that the center of mass is closer to the primary mirror 304 and the crosstalk moment of inertia (MOI) of the system can be reduced. The optical system 400 of FIG. 4 is different from the optical system 300 with regard to effective focal length and field-of-view. An advantage of the configuration of the optical system 400 is that placing the quaternary mirror 414 closer to the primary mirror 404 may make it easier to set a Lyot stop on the quaternary mirror 414 and the central hole size or aperture 410 of the primary mirror can be minimized.

Figure 5:
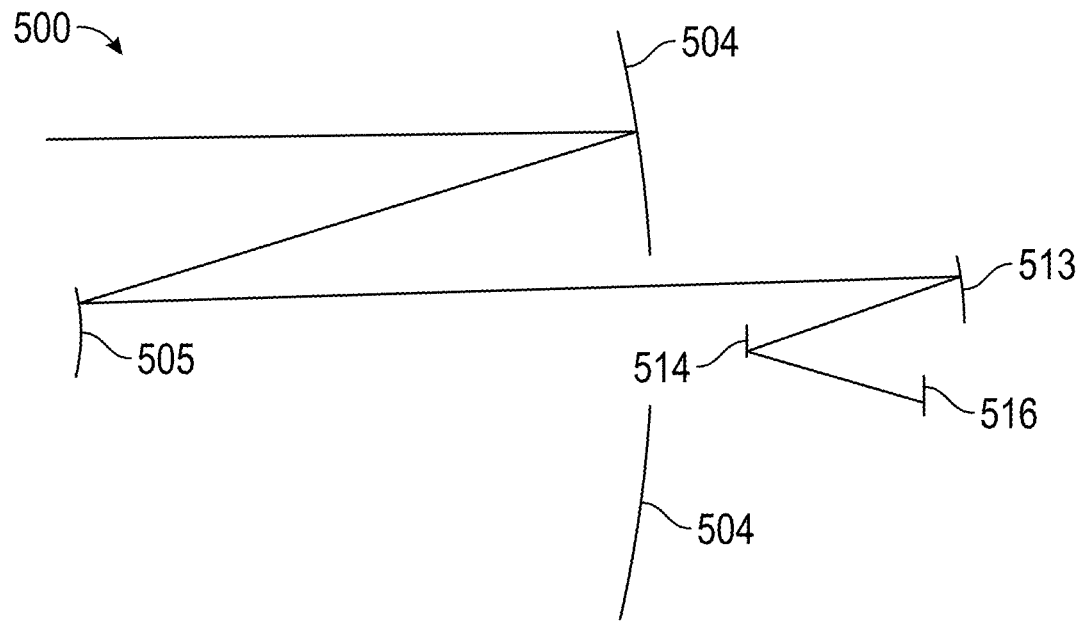
Figure 6:
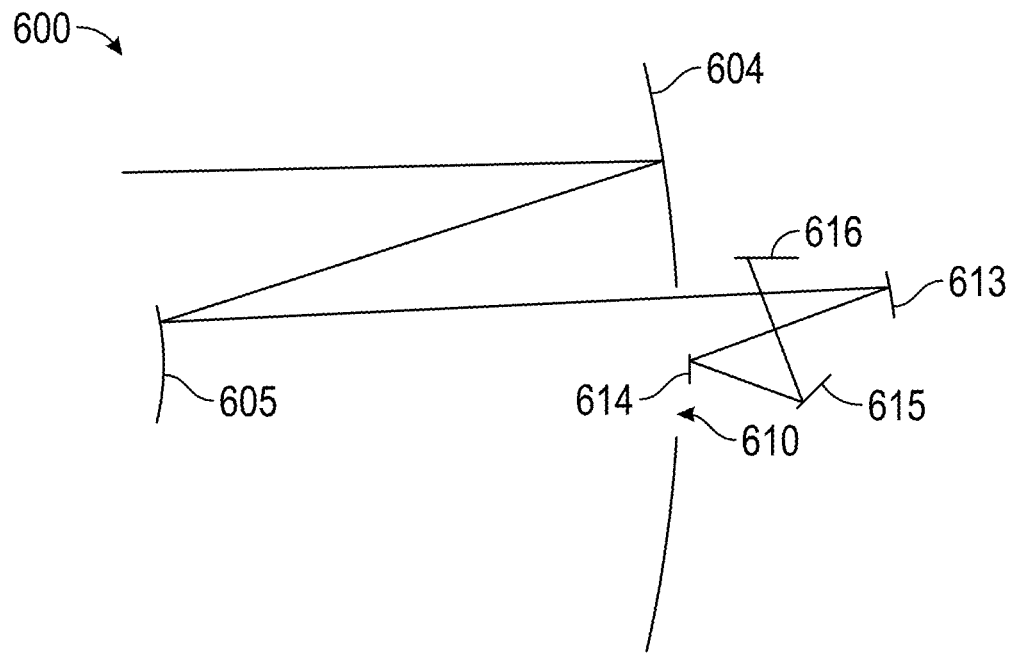
FIGS. 6-9 are schematics showing various embodiments of configuration layouts for mirrors, including one or more folding mirrors, and an imaging plane, that may be used with the various optical systems described herein.

Referring to FIG. 5, a schematic of another embodiment of an all-reflective optical system 500 is shown. The optical system 500 includes a primary mirror 504, a secondary mirror 505, a tertiary mirror 513, a quaternary mirror 514, and an image plane 516. The primary mirror 504, secondary mirror 505, tertiary mirror 513, quaternary mirror 514 and image plane 516 may have the same or similar features and/or functions as, respectively, the primary mirror 304, the secondary mirror 305, the tertiary mirror 313, the quaternary mirror 314 and the image plane 316 of the optical system 300, and vice versa.

However, in the optical system 500, the quaternary mirror 514 is located a distance behind the primary mirror 504 that is greater than a distance between the quaternary mirror 414 and the primary mirror 404 of the optical system 400 (see FIG. 4). Further, in the optical system 500, the tertiary mirror 513 is positioned a distance behind the primary mirror 504 that is greater than a distance of the respective corresponding mirrors of the optical system 400. In certain embodiments, the tertiary mirror 513 may be positioned a distance behind the primary mirror 504 that is in a range of 45% to 55% of the diameter of the primary mirror 504. The optical system 500 may be designed for much smaller pixel sensors, such as having a pixel size of less than 4 micrometers in certain embodiments. The optical system 500 may be different from the optical system 300 with respect to effective focal length and field-of-view. In some embodiments, the optical system 500 may have have a shorter effective focal length and a wider field-of-view relative to the optical system 300, which may allow the system 500 to include sensors with smaller pixel size. ut it may be relatively closer to an aperture 610 in the primary mirror 604. The tertiary mirror 613 is similarly positioned behind the primary mirror 604 as in the optical system 400. An added folding mirror 615 receives rays from the quaternary mirror 614 and reflects them to the image plane 616, which is positioned above the folding mirror 615. In certain embodiments, the image plane 616 is positioned to be above and parallel to the optical axis.

Some embodiments of the optical systems may have a longer system optical path length between the quaternary mirror 614 and the image plane 616 using the folding mirror 615. If the image plane 616 is behind the tertiary mirror 613, the system optical path length is the distance between the secondary mirror 605 and the image plane 616. With using the folding mirror 615, the system optical path length is the distance between the secondary mirror 605 and the tertiary mirror 613. The image plane 616 may be positioned to satisfy the requirement of focal length and field-of-view. The configuration of the optical system 600 may provide a compact design. Another advantage is that the system 600 may allow for easier installation of a sensor cooler and a radiating plate for the cooler. Furthermore, in the optical system 600, a sensor for the image plane can be positioned closer to the primary mirror supporting structure and the sensor can be held in a more stable way.

Figure 7:
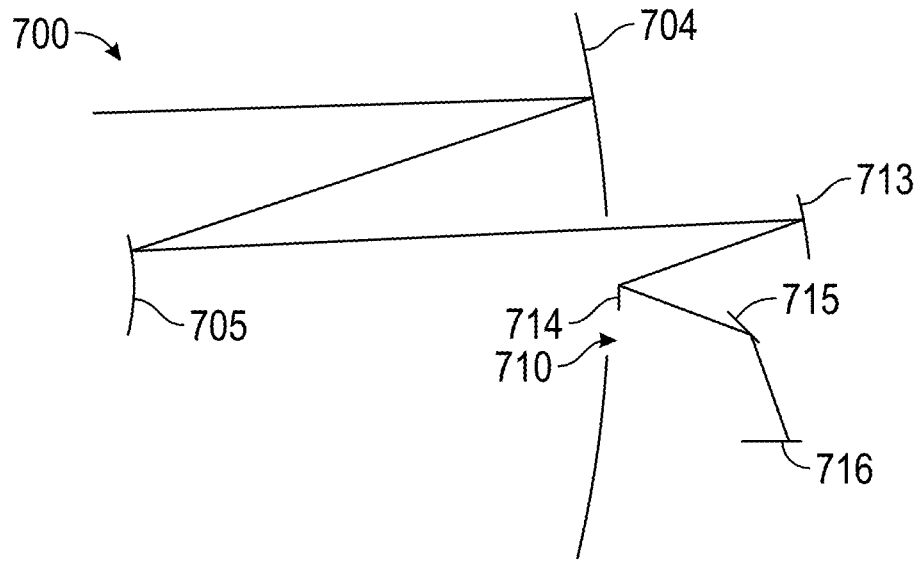

Referring to FIG. 7, another embodiment of an all-reflective optical system 700 having a folding mirror 715 is shown. The optical system 700 may have the same or similar features and/or functions as the optical system 600, and vice versa. The optical system 600 includes a primary mirror 704, a secondary mirror 705, a tertiary mirror 713, a quaternary mirror 714, and an image plane 716, which may have the same or similar features and/or functions as, respectively, the primary mirror 604, the secondary mirror 605, the tertiary mirror 613, the quaternary mirror 614, and the image plane 616 of the optical system 600, and vice versa. The quaternary mirror 714 is behind the primary mirror 704, as in the optical system 600, but is close to an aperture 710 in the primary mirror 704. The tertiary mirror 713 is similarly positioned behind the primary mirror 704 as in the optical system 600. The folding mirror 715 receives rays from the quaternary mirror 714 and reflects them to the image plane 716, which is positioned below the folding mirror 715. In certain embodiments, the image plane 716 is positioned to be below and parallel to the optical axis. An advantage of the configuration of the optical system 700 is that the configuration of the mirrors including the folding mirror 715 leads to a more compact design. Another advantage is that the optical system 700 can use a sensor for the image plane in a larger package. A CMOS sensor or a sensor with a ROIC tends to have larger package so that it can embrace more circuits or components that may help minimize readout noise, crosstalk, and blooming.

Figure 8:
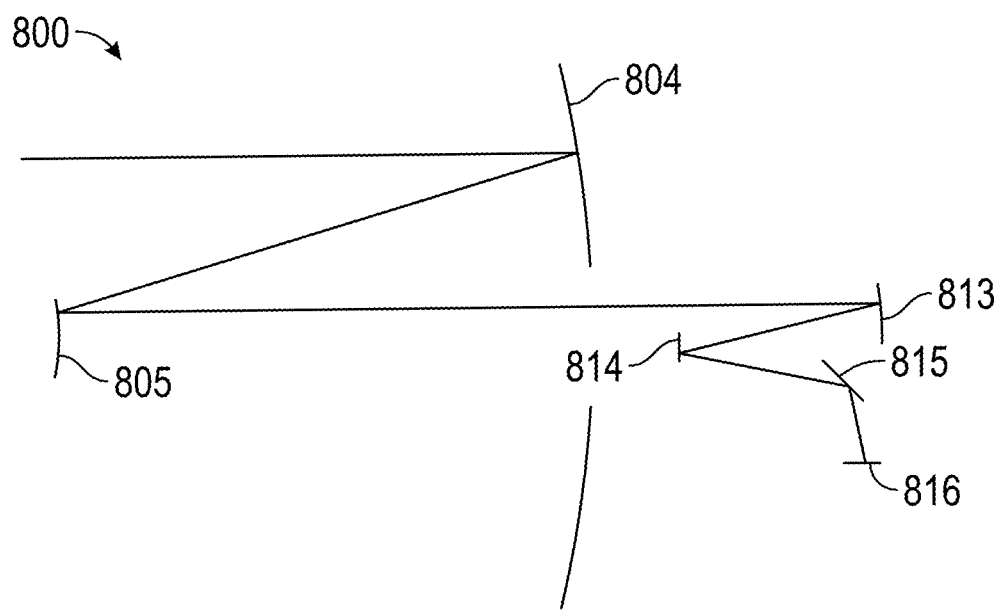

Referring to FIG. 8, another embodiment of an all-reflective optical system 800 having a folding mirror 815 is shown. The optical system 800 may have the same or similar features and/or functions as the optical system 700, and vice versa. The optical system 800 includes a primary mirror 804, a secondary mirror 805, a tertiary mirror 813, a quaternary mirror 814, and an image plane 816, which may have the same or similar features and/or functions as, respectively, the primary mirror 704, the secondary mirror 705, the tertiary mirror 713, the quaternary mirror 714, and the image plane 716 of the optical system 700, and vice versa. However, the image plane 816 is closer to the optical axis than the image plane 716 is close to its respective optical axis. The quaternary mirror 814 is behind the primary mirror 804 but is further behind it than in the respective corresponding components of the optical system 700. The tertiary mirror 813 is positioned further behind the primary mirror 804 than in the optical system 700. The folding mirror 815 receives rays from the quaternary mirror 814 and reflects them to the image plane 816, which is positioned below the folding mirror 815. In certain embodiments, the image plane 816 is positioned to be below and parallel to the optical axis. The optical system 800 is designed for smaller pixel sensors, which are usually commercial or MIL-STD. An advantage of the optical system 800 is that it can utilize up-to-date sensors, including commercial or MIL-STD sensors.

Figure 9:
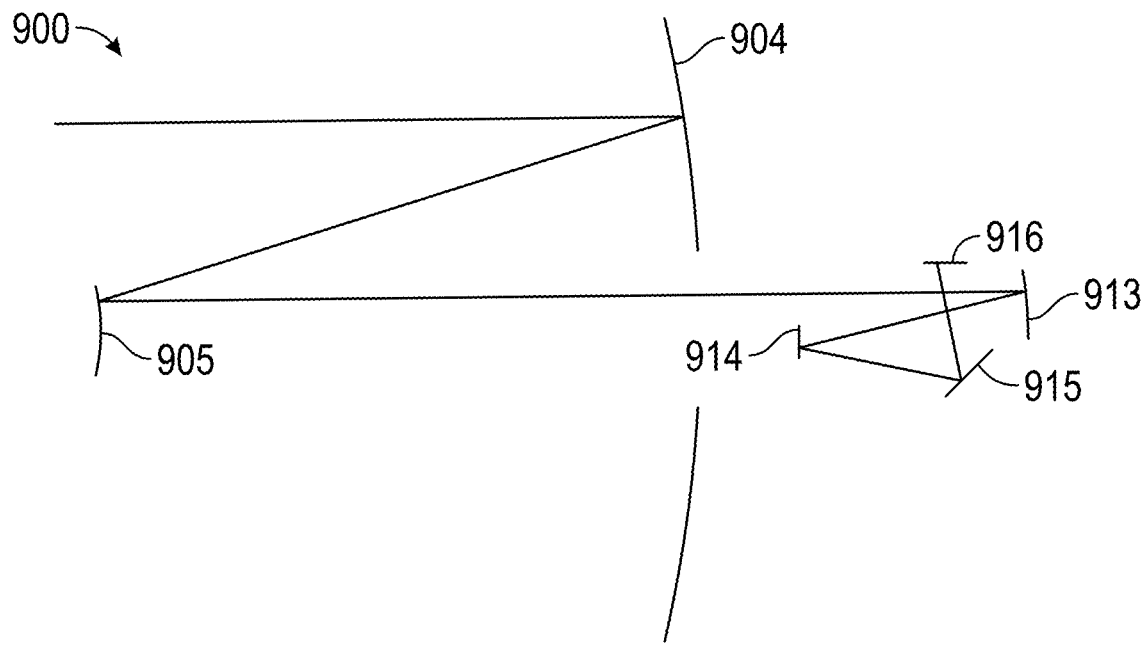

Referring to FIG. 9, another embodiment of an all-reflective optical system 900 having a folding mirror 915 is shown. The optical system 900 may have the same or similar features and/or functions as the optical system 800. The optical system 900 includes a primary mirror 904, a secondary mirror 905, a tertiary mirror 913, a quaternary mirror 914, and an image plane 916, which may have the same or similar features and/or functions as, respectively, the primary mirror 804, the secondary mirror 805, the tertiary mirror 813, the quaternary mirror 814, and the image plane 816 of the optical system 800, and vice versa.

However, in the optical system 900, the image plane 916 is closer to the optical axis than the image plane 816 is close to its respective optical axis. The quaternary mirror 914 is behind the primary mirror 904, in a similar distance to that of the optical system 800. The tertiary mirror 913 is positioned behind the primary mirror 904 in a similar distance to that of the optical system 800. The folding mirror 915 receives rays from the quaternary mirror 914 and reflects them to the image plane 916, which is positioned above the folding mirror 915. In certain embodiments, the image plane 916 is positioned to be above and parallel to the optical axis. Advantages of the optical system 900 are that a sensor of the image plane can be more stable against vibration and that a cooler with a radiator can be installed in an easier way than in other optical system configurations.

Figure 10:
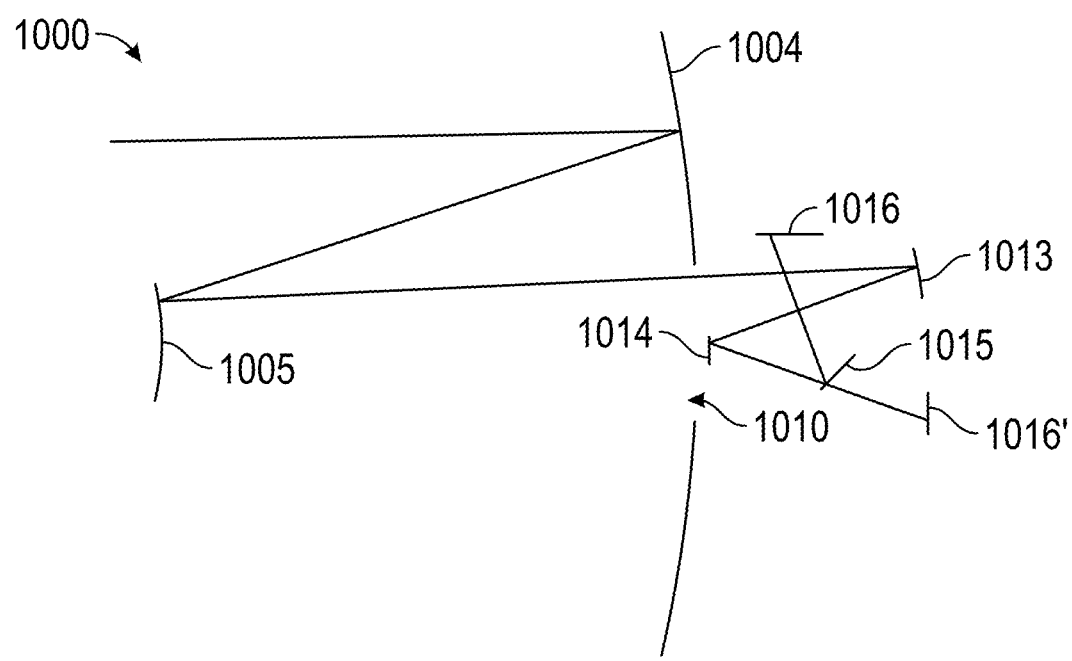
FIGS. 10-13 are schematics showing various embodiments of configuration layouts for mirrors, including one or more folding mirrors, and two imaging planes, that may be used with the various optical systems described herein.

Referring to FIG. 10, an embodiment of an all-reflective optical system 1000 having multiple image planes and a folding mirror 1015 is shown. The optical system 1000 may have the same or similar features and/or functions as the optical system 600. The optical system 1000 includes a primary mirror 1004, a secondary mirror 1005, a tertiary mirror 1013, a quaternary mirror 1014, and a first image plane 1016, which may have the same or similar features and/or functions as, respectively, the primary mirror 604, the secondary mirror 605, the tertiary mirror 613, the quaternary mirror 614 and the image plane 616 of the optical system 600, and vice-versa. The first image plane 1016 is a similar distance to the optical axis as the image plane 616 is to its respective optical axis. However, optical system 1000 has a second image plane 1016' similar to the first image plane 1016. The first image plane 1016 can be dedicated to a first spectral range and the second image plane 1016' can be dedicated to a second spectral range.

The quaternary mirror 1014 is behind the primary mirror 1004 and is close to an aperture 1010 in the primary mirror 1004 at a distance similar to that in the respective corresponding components of the optical system 600. The tertiary mirror 1013 is positioned behind the primary mirror 1004 in a similar distance to that in the respective corresponding components of the optical system 600. The folding mirror 1015 receives rays from the quaternary mirror 1014 and reflects some of the rays within a certain spectral range to the first image plane 1016, which is positioned above the folding mirror 1015. The folding mirror 1015 may be transmissive to rays within a second different range from that which is reflected. The optical system 1000 enables simultaneous multi-color imaging by having the folding mirror 1015 be reflective over the first spectral range and transmissive over the second spectral range. In certain embodiments, the first image plane 1016 is positioned to be above and parallel to the optical axis, and the second image plane 1016' is positioned to be below and perpendicular to the optical axis on an opposite side of the optical axis as the first image plane 1016. An advantage of the optical system 1000 is that it can perform multicolor imaging due to the properties of the folding mirror and the multiple imaging planes.

Figure 11:
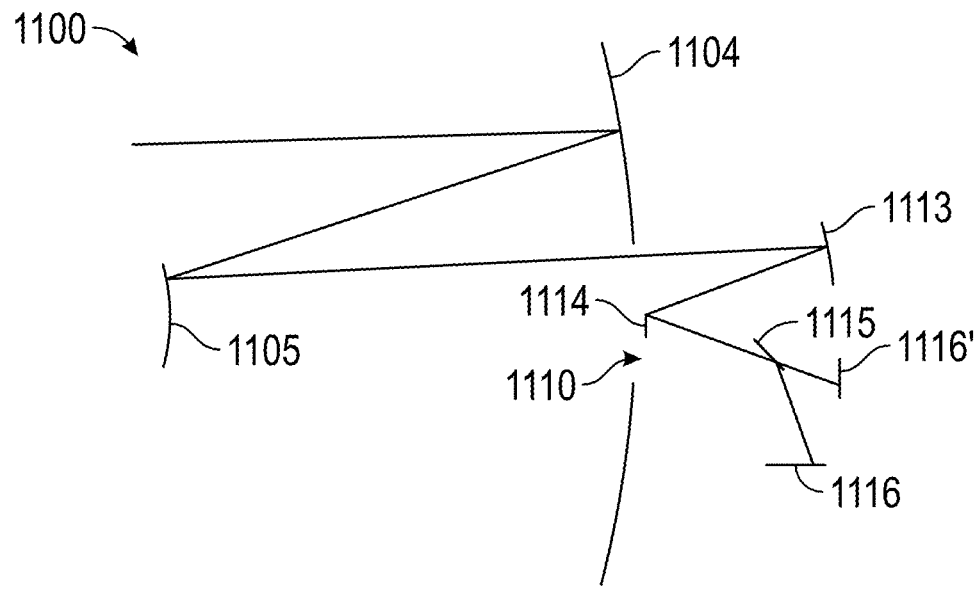

Referring to FIG. 11, another embodiment of an all-reflective optical system 1100 having multiple image planes and a folding mirror 1115 is shown. The optical system 1100 may have the same or similar features and/or functions as the optical system 1000. The optical system 1100 includes a primary mirror 1104, a secondary mirror 1105, a tertiary mirror 1113, a quaternary mirror 1114, a folding mirror 1115 and a first image plane 1116, which may have the same or similar features and/or functions as, respectively, the primary mirror 1004, the secondary mirror 1005, the tertiary mirror 1013, the quaternary mirror 1014, the folding mirror 1015 and the first image plane 1016 of the optical system 1000, and vice versa. However, in the optical system 1100, the first image plane 1116 is positioned at a greater distance to the optical axis than the first image plane 1016 is to its respective optical axis. The optical system 1100 has a second image plane 1116' similar to the first image plane 1116. The first image plane 1116 can be dedicated to a first spectral range and the second image plane 1116' can be dedicated to a second spectral range.

The quaternary mirror 1114 is behind the primary mirror 1104 and is close to an aperture 1110 in the primary mirror 1104 at a distance similar to that in the respective corresponding components of the optical system 1000. The tertiary mirror 1113 is positioned behind the primary mirror 1104 in a similar distance to that in the respective corresponding components of the optical system 1000. The folding mirror 1115 receives rays from the quaternary mirror 1114 and reflects some of them to the first image plane 1116, which is positioned below the folding mirror 1115. The optical system 1100 enables simultaneous multi-color imaging by having the folding mirror 1115 be reflective over a first spectral range and transmissive over a second spectral range. In certain embodiments, the first image plane 1116 is positioned to be below and parallel to the optical axis, and the second image plane 1116' is positioned to be below and perpendicular to the optical axis. An advantage is that the optical system 1100 can use a sensor for the image plane in a larger package. A CMOS sensor or a sensor with a ROIC tends to have larger package so that it can embrace more circuits or components that may help minimize readout noise, crosstalk, and blooming.

Figure 12:
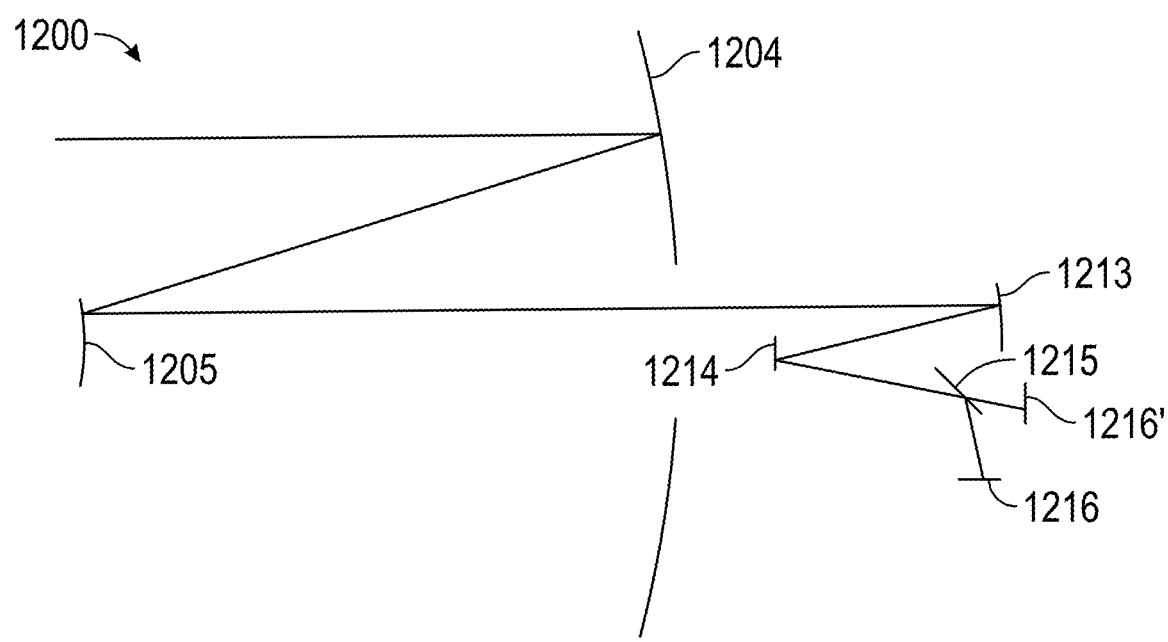

Referring to FIG. 12, another embodiment of an all-reflective optical system 1200 having multiple image planes and a folding mirror 1215 is shown. The optical system 1200 may have the same or similar features and/or functions as the optical system 1100. The optical system 1200 includes a primary mirror 1204, a secondary mirror 1205, a tertiary mirror 1213, a quaternary mirror 1214, a folding mirror 1215 and a first image plane 1216, which may have the same or similar features and/or functions as, respectively, the primary mirror 1104, the secondary mirror 1105, the tertiary mirror 1113, the quaternary mirror 1114, the folding mirror 1115 and the first image plane 1116 of the optical system 1100, and vice versa. However, in the optical system 1200, the first image plane 1216 is positioned at a shorter distance to the optical axis than the first image plane 1116 is to its respective optical axis. The optical system 1200 has a second image plane 1216' similar to the first image plane 1216. The first image plane 1216 can be dedicated to a first spectral range and the second image plane 1216' can be dedicated to a second spectral range.

The quaternary mirror 1214 is behind the primary mirror 1204 at a distance greater than in the respective corresponding components of the optical system 1100. The tertiary mirror 1213 is positioned behind the primary mirror 1204 at a greater distance than in the respective corresponding components of the optical system 1100. The folding mirror 1215 receives rays from the quaternary mirror 1214 and reflects them to the first image plane 1216, which is positioned below the folding mirror 1215. The optical system 1200 enables simultaneous multi-color imaging by having the folding mirror 1215 be reflective over the first spectral range and transmissive over the second spectral range. In certain embodiments, the first image plane 1216 is positioned to be below and parallel to the optical axis, and the second image plane 1216' is positioned to be below and perpendicular to the optical axis. The second image plane 1216' is positioned to be closer to the optical axis than the second image plane 1116' is close to its respective optical axis. The optical system 1200 is designed to utilize smaller pixel sensors for the image plane. An advantage of the optical system 1200 is that it can utilize up-to-date sensors, including commercial or MIL-STD sensors.

Figure 13:
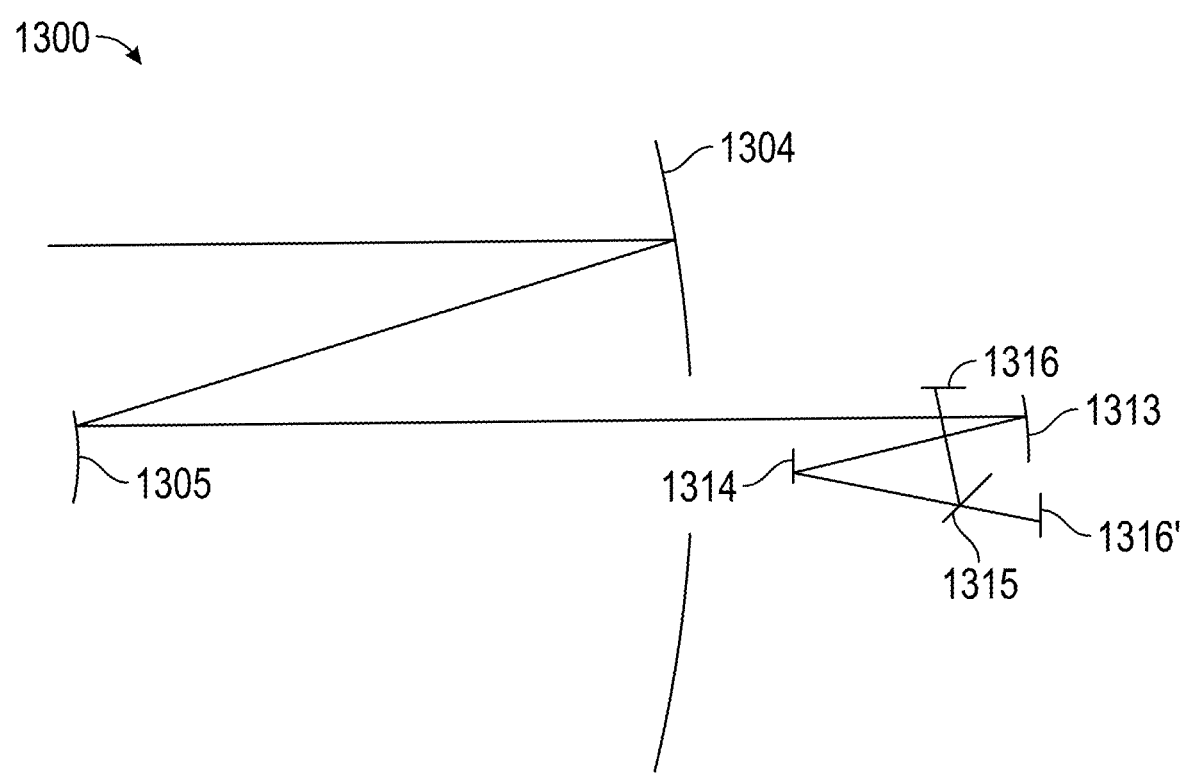

Referring to FIG. 13, another embodiment of an all-reflective optical system 1300 having multiple image planes and a folding mirror 1315 is shown. The optical system 1300 may have the same or similar features and/or functions as the optical system 1000. The optical system 1300 includes a primary mirror 1304, a secondary mirror 1305, a tertiary mirror 1313, a quaternary mirror 1314, a folding mirror 1315 and a first image plane 1316, which may have the same or similar features and/or functions as, respectively, the primary mirror 1004, the secondary mirror 1005, the tertiary mirror 1013, the quaternary mirror 1014, the folding mirror 1015 and the first image plane 1016 of the optical system 1000, and vice versa. However, in the optical system 1300, the first image plane 1316 is positioned at a shorter distance to the optical axis than the first image plane 1016 is to its respective optical axis. The optical system 1300 has a second image plane 1316' similar to the first image plane 1316. The first image plane 1316 can be dedicated to a first spectral range and the second image plane 1316' can be dedicated to a second spectral range.

The quaternary mirror 1314 is behind the primary mirror 1304 at a distance greater than in the respective corresponding components of the optical system 1000. The tertiary mirror 1313 is positioned behind the primary mirror 1304 at a greater distance than that in the respective corresponding components of the optical system 1000. The folding mirror 1315 receives rays from the quaternary mirror 1314 and reflects them to the first image plane 1316, which is positioned above the folding mirror 1315. The optical system 1300 enables simultaneous multi-color imaging by having the folding mirror 1315 be reflective over the first spectral range and transmissive over the second spectral range. In certain embodiments, the first image plane 1316 is positioned to be above and parallel to the optical axis, and the second image plane 1316' is positioned to be below and perpendicular to the optical axis. The second image plane 1316' is positioned to be closer to the optical axis than the second image plane 1016' is close to its respective optical axis. An advantage of the optical system 1300 is that a cooler with a radiator for the sensor can be installed in an easier way than in other optical system configurations.

Figure 14A:
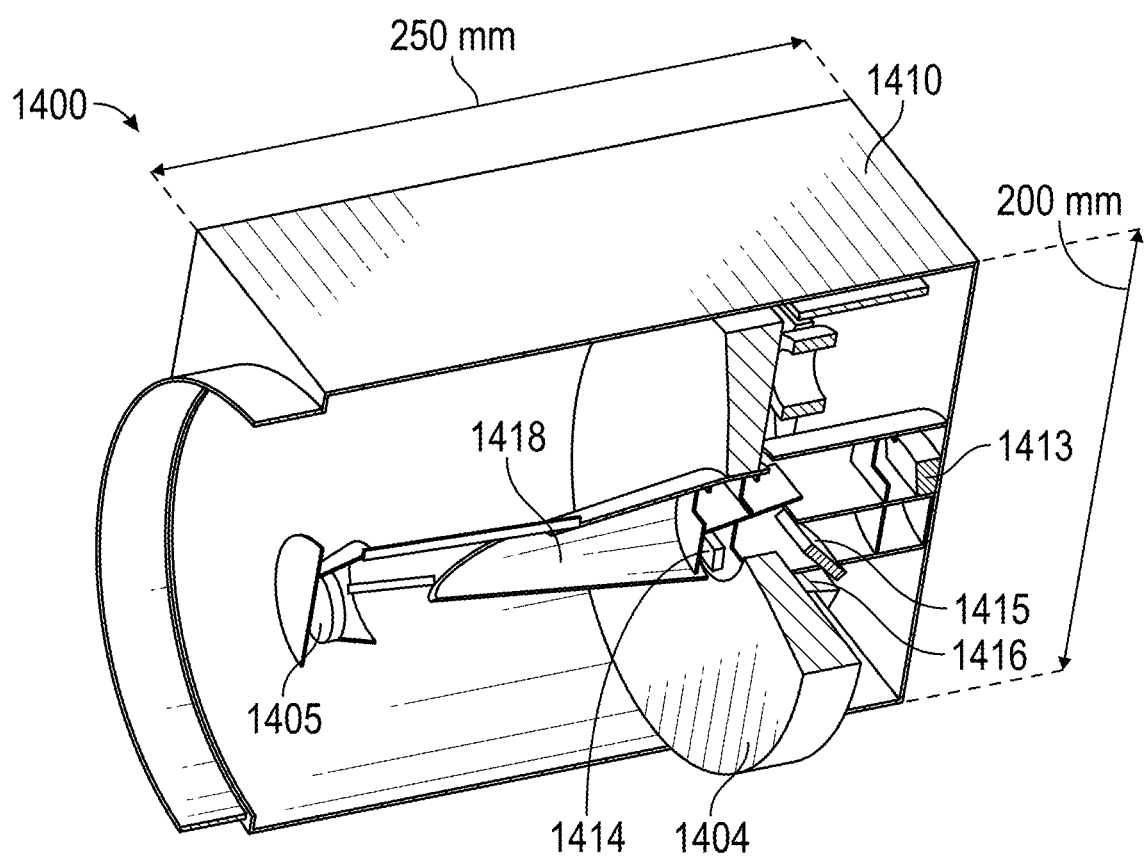
FIGS. 14A-14D are various views of an embodiment of a camera system that includes the optical system of FIG. 1.

Referring to FIG. 14A, a cross-sectional perspective view of a camera system 1400 having an optical system is illustrated. A box 1410 illustrates enclosing of the camera and can be a mechanical interface to a satellite BUS. A metering structure 1418, shown as a cone shaped structure, maintains a distance between a primary mirror 1404 and a secondary mirror 1405. The metering structure 1418 may maintain this distance within one micrometer when a temperature changes by 1° C. degree. A supporting structure 1408, best shown as a cylindrical tube in FIG. 14D, supports the primary mirror 1404. In certain embodiments, the radius of the cylindrical structure 1408 can be defined by a radius from the portion of the optical axis extending between the primary mirror 1404 and the secondary mirror 1405. The inner surface of the curved sidewall of the cylindrical structure 1408 can be a limit of the specific distance from the optical axis for the image plane 316 described above.

In certain embodiments, dimensions of the camera are 200 mm×200 mm×250 mm. Depending on the focal length of an optical system, the dimensions may range from 75 mm×75 mm×100 mm, designed for 5 m resolution at 500 km, to dimensions of 750 mm×750 mm×1000 mm, designed for 0.25 m resolution at 500 km. The overall volumetric envelope of the camera system may be less than 0.01 m3, less than 0.008 m3, less than 0.006 m3, less than 0.004 m3, less than 0.003 m3, less than 0.001 m3, or from 0.0005 m3 to 0.01 m3.

The form factor is defined as the ratio of a distance between the secondary and tertiary mirror to a focal length of the optical system. The distance between the secondary and tertiary mirror may be measured along the optical path. In certain embodiments, the optical system can be implemented in a form factor having the values described above, for example of less than 0.2, less than 0.15, or less than 0.1. For the prior art, the form factor is known to be more than 0.25. With the relatively smaller form factor of the optical systems described herein, the optical system can provide imaging resolution better than 1 m, 0.5 m, or 0.25 m at 500 km altitude. The optical system can also be capable of imaging resolution better than 0.1 m in an elliptical orbit. In other embodiments, the form factor can be in a range between 0.04 and 0.09. Examples of focal lengths, distances between the secondary mirror and the tertiary mirror for each focal length and a corresponding form factor of the system are provided in Table 2.

TABLE 2

| Focal Length (mm) | Distance between the secondary mirror and the tertiary mirror (mm) | Form Factor (Distance/ Focal Length) |
| --- | --- | --- |
| 2300 | 340 | 0.15 |
| 2600 | 245 | 0.09 |
| 2700 | 250 | 0.09 |
| 2750 | 143 | 0.05 |
| 2850 | 260 | 0.09 |
| 2900 | 300 | 0.10 |
| 3300 | 200 | 0.06 |
| 3575 | 300 | 0.08 |
| 3600 | 300 | 0.08 |
| 3600 | 260 | 0.07 |
| 3850 | 355 | 0.09 |
| 4000 | 265 | 0.07 |
| 4000 | 240 | 0.06 |
| 4000 | 275 | 0.07 |
| 4500 | 375 | 0.08 |
| 4650 | 375 | 0.08 |
| 5000 | 365 | 0.07 |
| 5150 | 295 | 0.06 |
| 5200 | 355 | 0.07 |
| 5300 | 630 | 0.12 |
| 5300 | 275 | 0.05 |
| 5500 | 355 | 0.06 |
| 5750 | 325 | 0.06 |
| 6250 | 675 | 0.11 |
| 7150 | 390 | 0.05 |
| 7500 | 400 | 0.05 |
| 8500 | 770 | 0.09 |
| 9000 | 460 | 0.05 |
| 20000 | 775 | 0.04 |

Figure 14B:
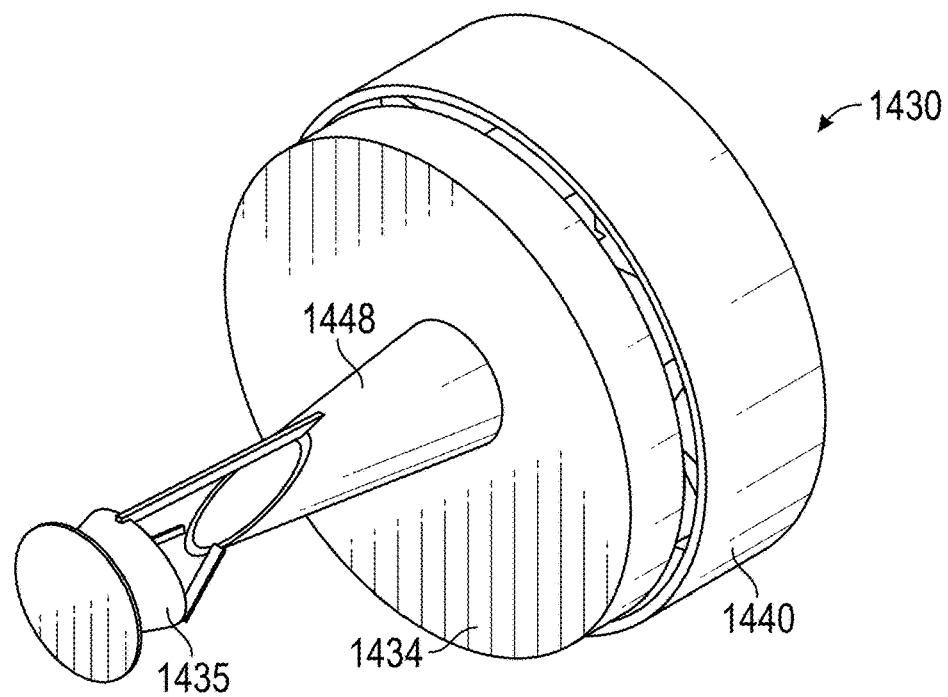

Referring to FIG. 14B, an embodiment of an optical system 1430 for cameras is illustrated. A metering structure 1448, shown as a cone shaped structure, keeps a distance between a primary mirror 1434 and a secondary mirror 1435 to the design within +/−one micrometer when a temperature changes by one Celsius degree.

For thermal controlling of the metering structure, temperature sensors and heaters (wire or patch type) can be installed on the metering structure. Payload control electronics reads the data from the temperature sensors and control the heaters to keep the metering structure 1448 within a specified range so that the focus of the camera system is on aggregated sensors.

A ring structure 1440 is a supporting structure for the primary mirror 1434 and supports the primary mirror kinematically so as to minimize structural distortion that may be induced during assembly. Also, the ring structure 1440 can be an interface to a satellite BUS, which can eliminate the need of a box-type enclosure, such as the enclosure 1410 shown in FIG. 14A.

Figure 14C:
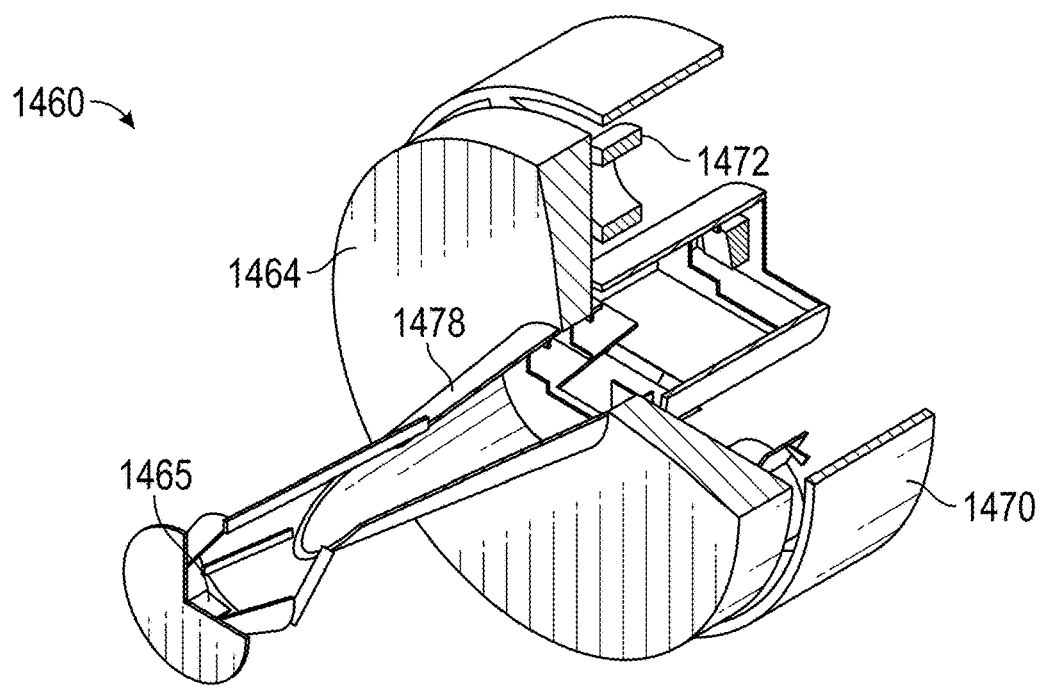

Referring to FIG. 14C, a partial cross-sectional perspective view of an optical system 1460 for cameras is illustrated. A metering structure 1478, shown cone-shaped, maintains a distance between a primary mirror 1464 and a secondary mirror 1465, which may be maintained in some embodiments within ±one micrometer when a temperature of the metering structure 1478 changes by one Celsius degree. The supporting structure 1470, shown as a ring-shaped structure, for the primary mirror 1464 supports a primary mirror kinematic mounting structure 1472 so as to minimize structural distortion that may be induced during assembly. Also, the supporting structure 1470 can be an interface to a satellite BUS. In certain embodiments, the radius of the supporting structure 1470 can be defined by a physical radius from the optical axis of the primary mirror 1464. The inner surface of the ring structure 1470 can be a limit of the specific distance from the optical axis for the image plane 316 described above. A diameter of the primary mirror 1464, which is about 7% of the focal length of the optical system, determines a width and height of the camera system. The length of the camera system is determined by the distance between the secondary mirror 1465 and a tertiary mirror, which is about 4 to 9% of the focal length of the optical system.

Figure 14D:
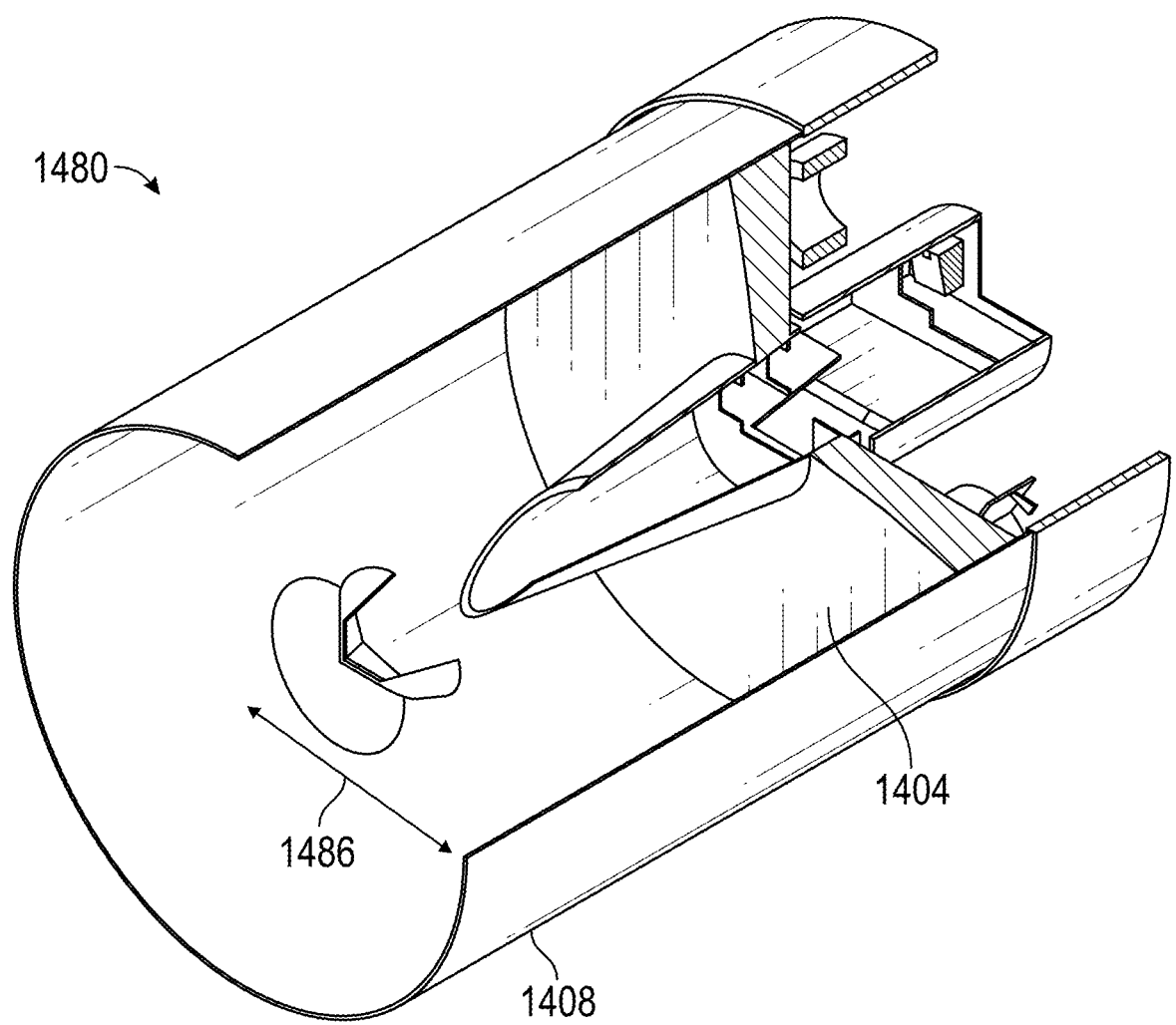

FIG. 14D is a partial cross-sectional perspective view of an optical system 1480 showing the cylindrical housing 1408 having a radius 1486 equal to the radius of the primary mirror 1404. The imaging plane may be located a radial distance from the optical axis that is no more the radius 1486. The housing 1408 may thus also have the same or nearly the same radius as the primary mirror for space savings. The optical axis extends between vertices of the primary and secondary mirrors.

Performance

The performance of the optical system 100 and the optical system 150 was analyzed to assess its design Modulation Transfer Function (MTF), tolerance MTF, and its distortion. Even though MTF and distortion is a way to evaluate optical performance of the system, they also indicate how the quality of resulting images will be. The MTF of panchromatic band is lower than other big camera systems, which cannot be avoided due to its smaller aperture size. Despite the lower MTF values, image quality can be enhanced by post processing on ground and also benefits by having a smaller anti-aliasing effect.

Figure 15A:
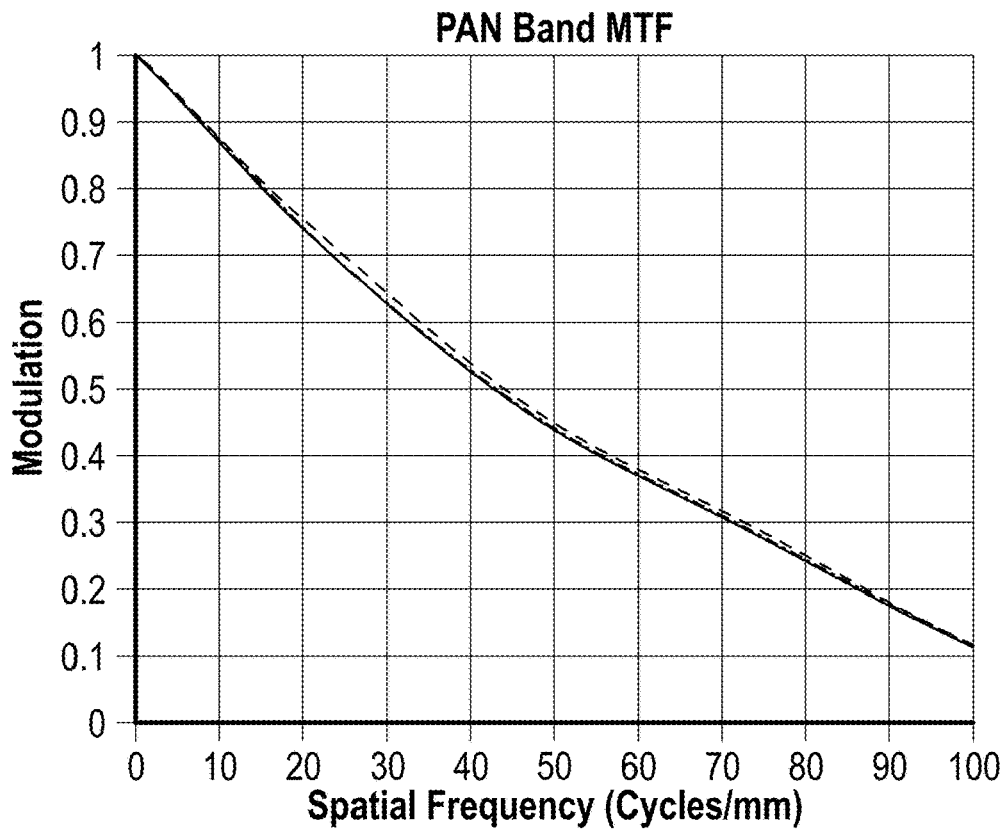
FIGS. 15A-17B are graphical plots showing various embodiments of performance characteristics for the optical system of FIG. 1A.
Figure 15B:
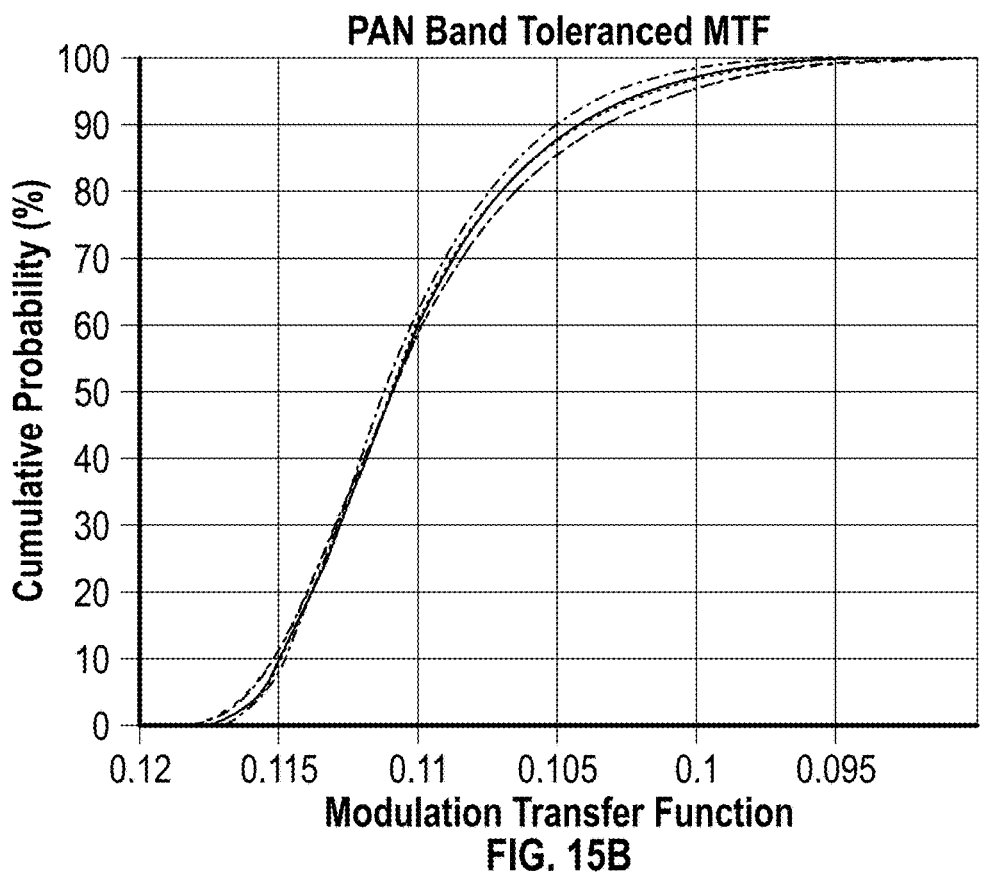

Referring to FIGS. 15A and 15B, the graphs present the optical design MTF and tolerance MTF, respectively, of the panchromatic band for the optical system 100. The Nyquist frequencies at which the MTF values are estimated are 100 mm/cycle for the panchromatic band and 25 mm/cycle for the multispectral bands. For tolerancing, sensitivity of each component is studied with assembly and alignment logics considered.

Figure 16A:
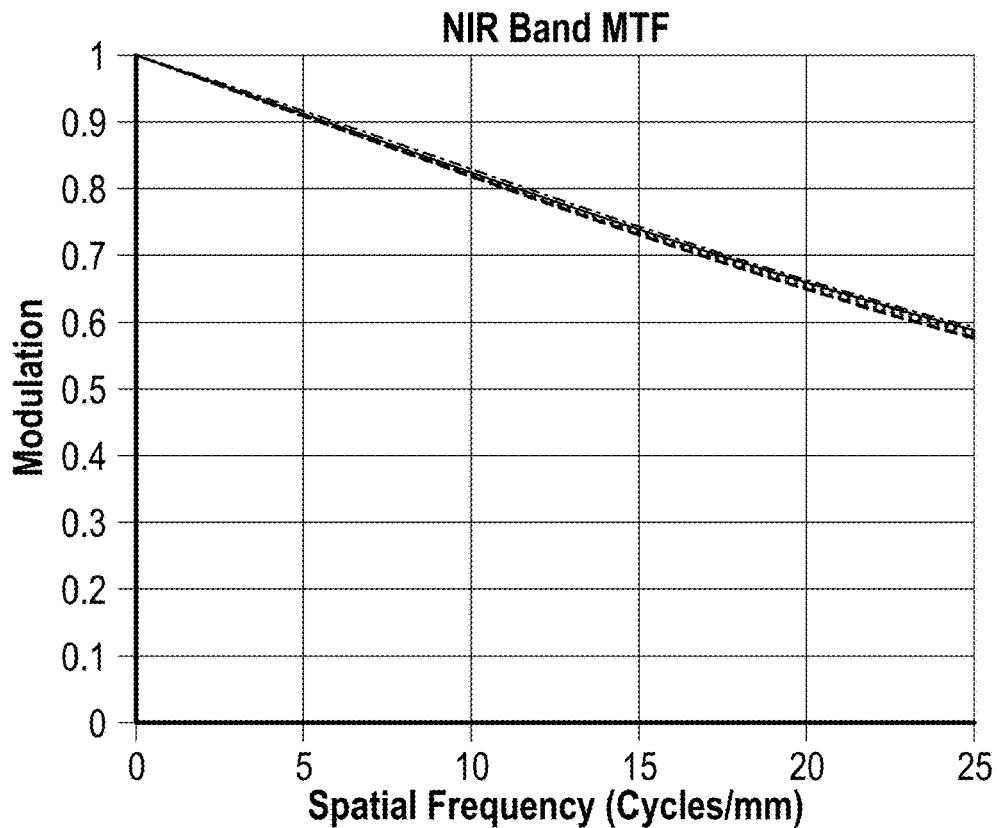
Figure 16B:
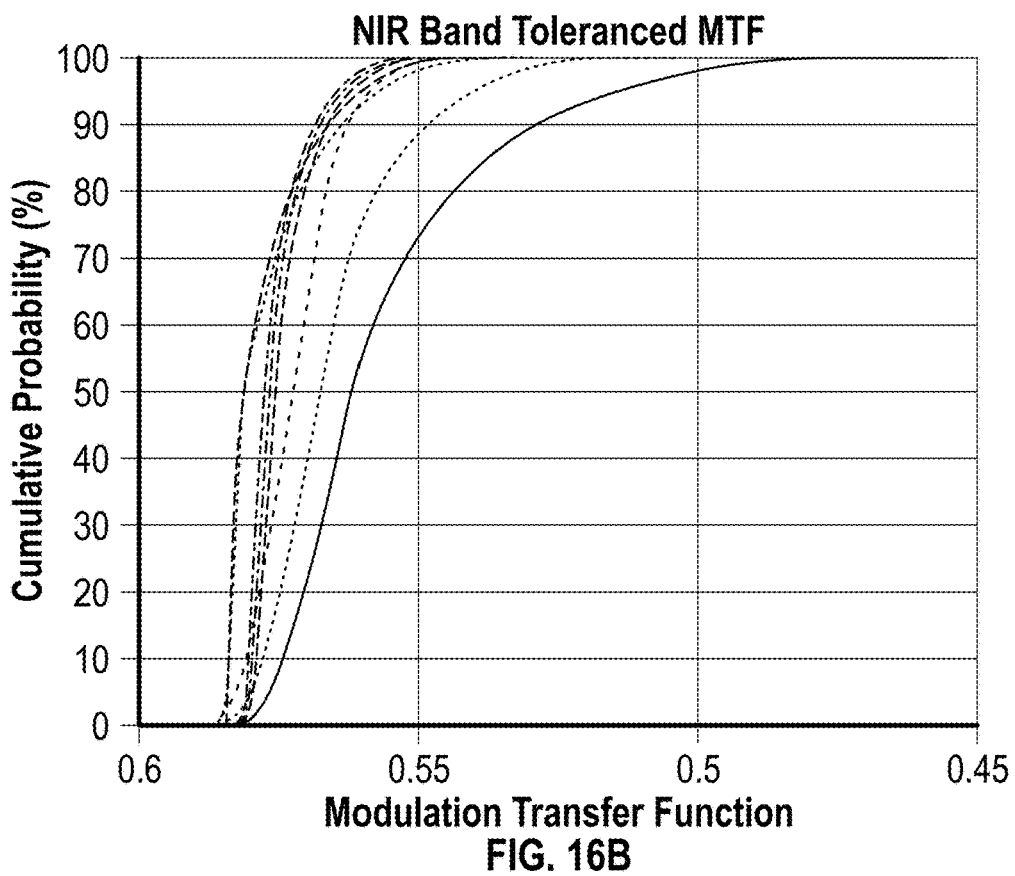
Figure 17A:
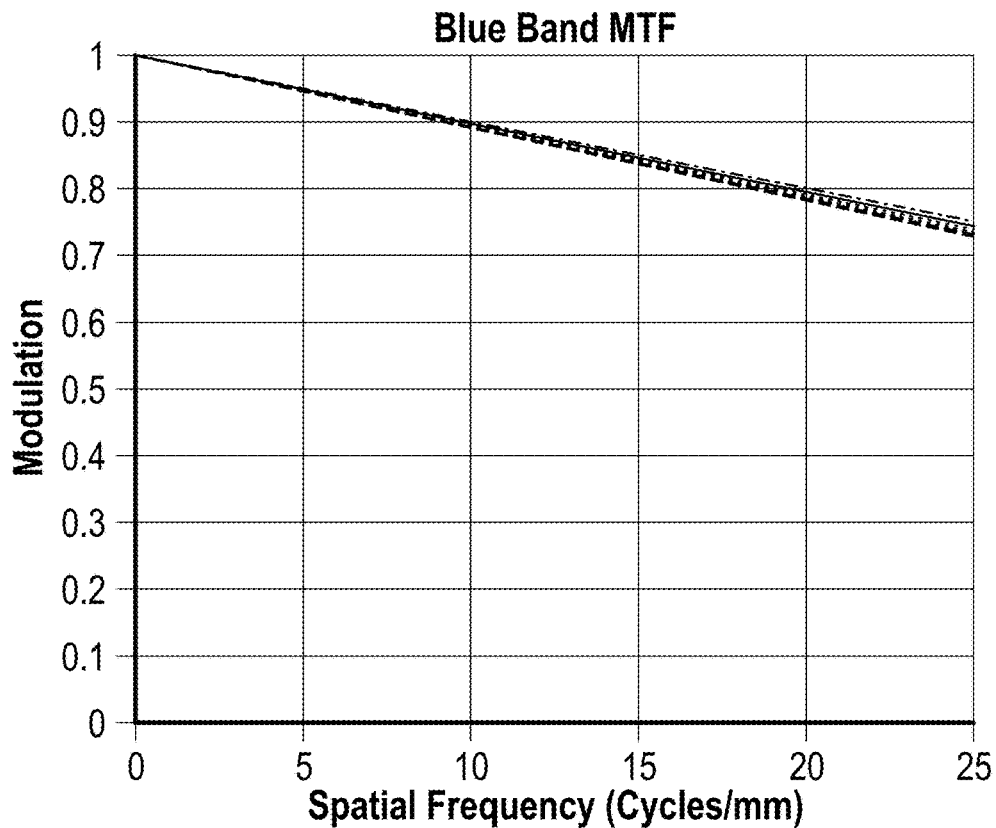
Figure 17B:
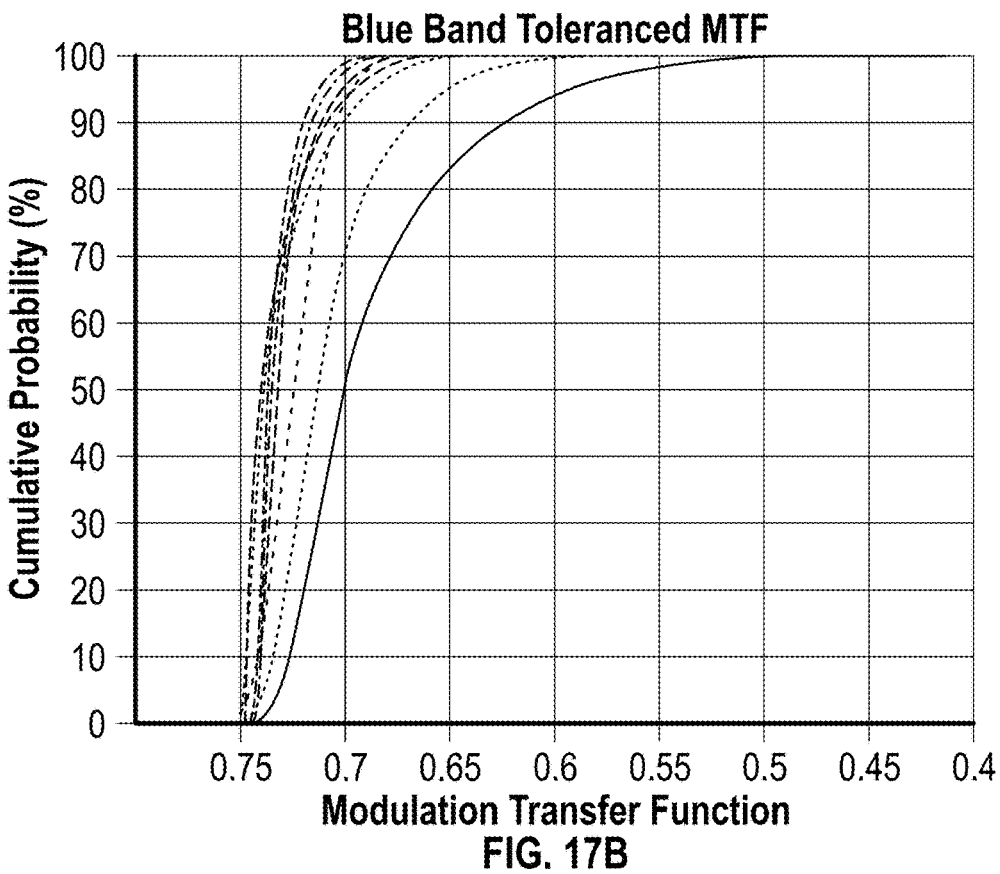

Referring to FIGS. 16A and 16B, the graphs present the optical design MTF and tolerance MTF, respectively, of the near-infrared (NIR) band for the optical system 100. Referring to FIGS. 17A and 17B, the graphs present the optical design MTF and tolerance MTF, respectively, of the blue band for the optical system 100.

The estimated MTF values of optical system 100 are summarized in Table 3. For panchromatic band, the design MTF is higher than 11% and tolerance value is slightly above 10%. For multispectral bands, the design values are greater than 57% and tolerance values are better than 51%. With tolerancing, MTF drop is higher in multispectral bands because those are located away from optical axis with their lower sampling frequency reflected.

TABLE 3

| Spectral bands | Design MTF (%) | Tolerance MTF (%) |
| --- | --- | --- |
| PAN (450~720 nm) | ≥11 | ≥10 |
| NIR (770~890 nm) | ≥57 | ≥51 |
| RED (630~690 nm) | ≥63 | ≥55 |
| GREEN (520~590 nm) | ≥68 | ≥57 |
| BLUE (450~520 nm) | ≥72 | ≥59 |

Figure 18A:
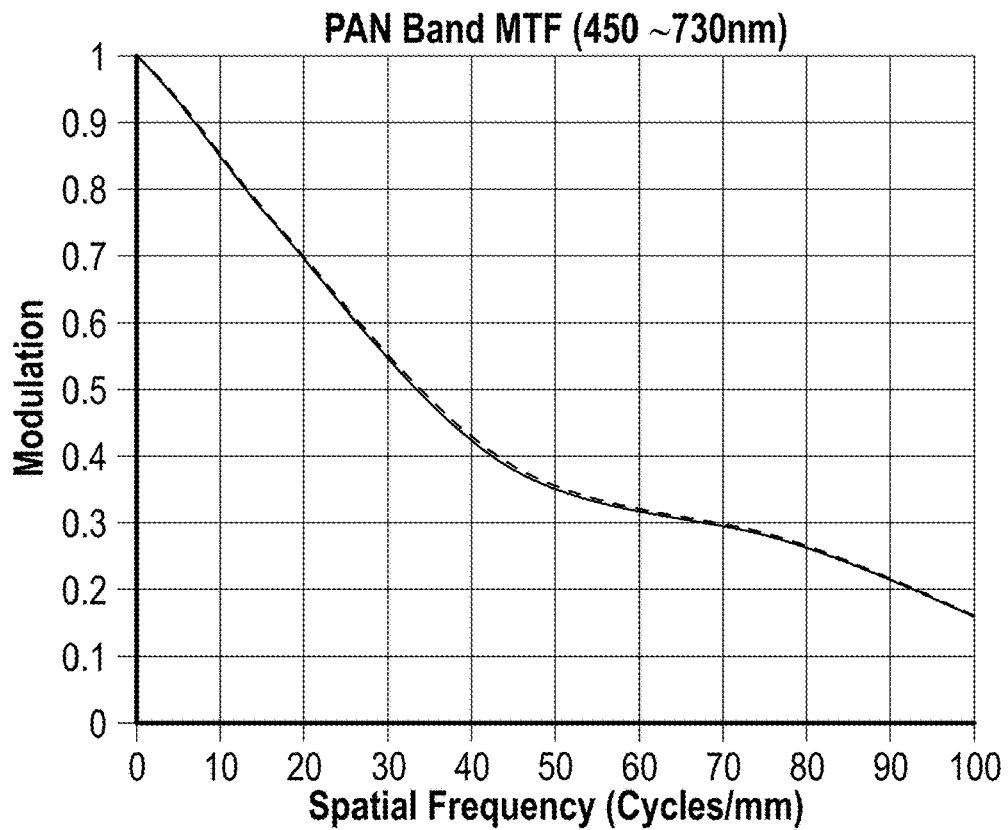
FIGS. 18A-20B are graphical plots showing various embodiments of performance characteristics for the optical system of FIG. 1C.
Figure 18B:
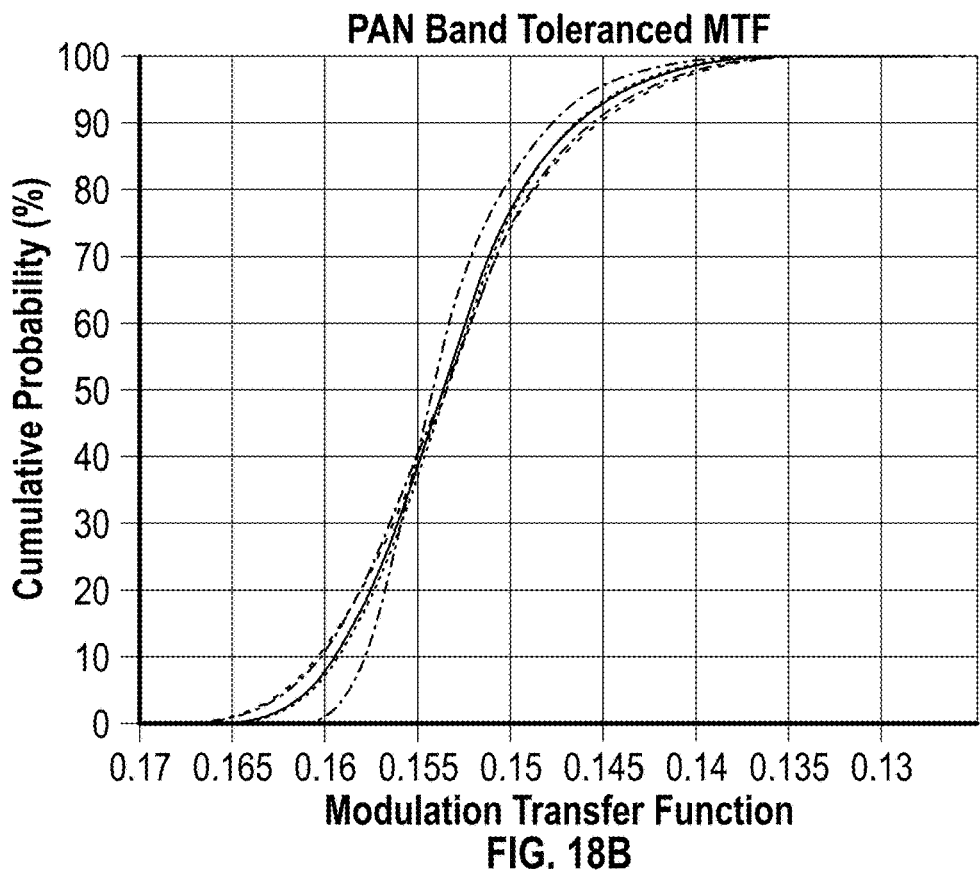

Referring to FIGS. 18A and 18B, the graphs present the analysis results of optical design MTF and tolerance MTF, respectively, of the panchromatic band for the optical system 150. In a similar manner as for the optical system 100, the Nyquist frequencies are 100 mm/cycle for the panchromatic band and 25 mm/cycle for the multispectral bands. Sensitivity of each component was studied and fed into the analysis with assembly and alignment logics considered.

Figure 19A:
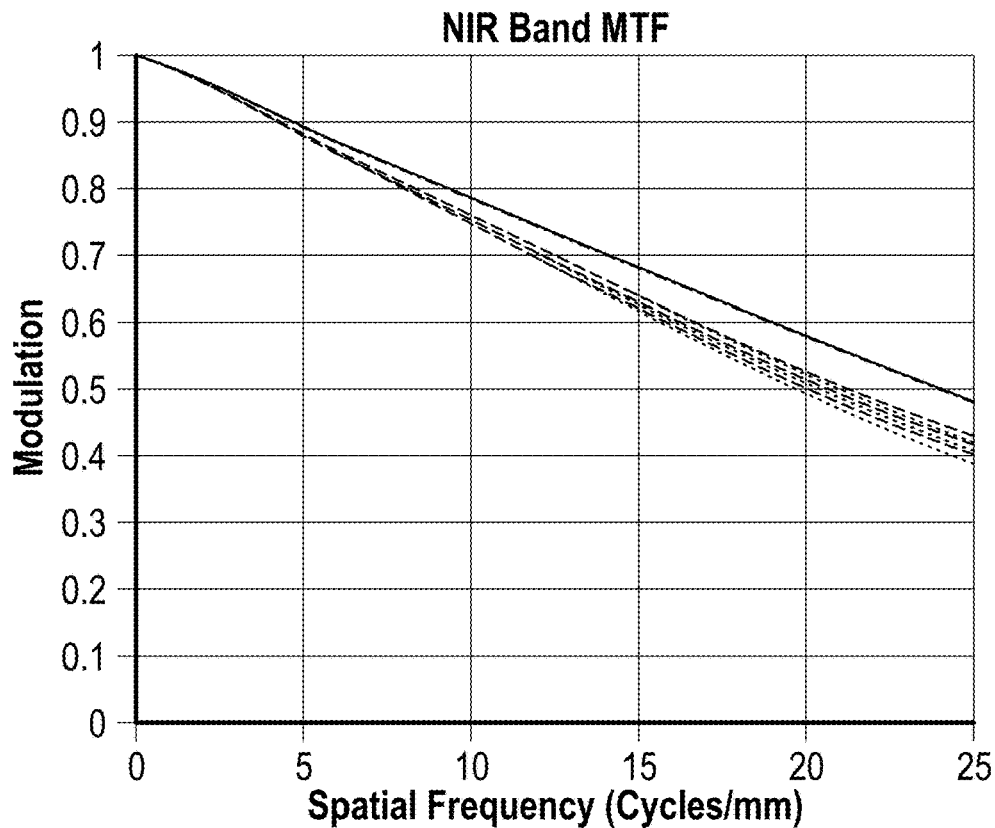
Figure 19B:
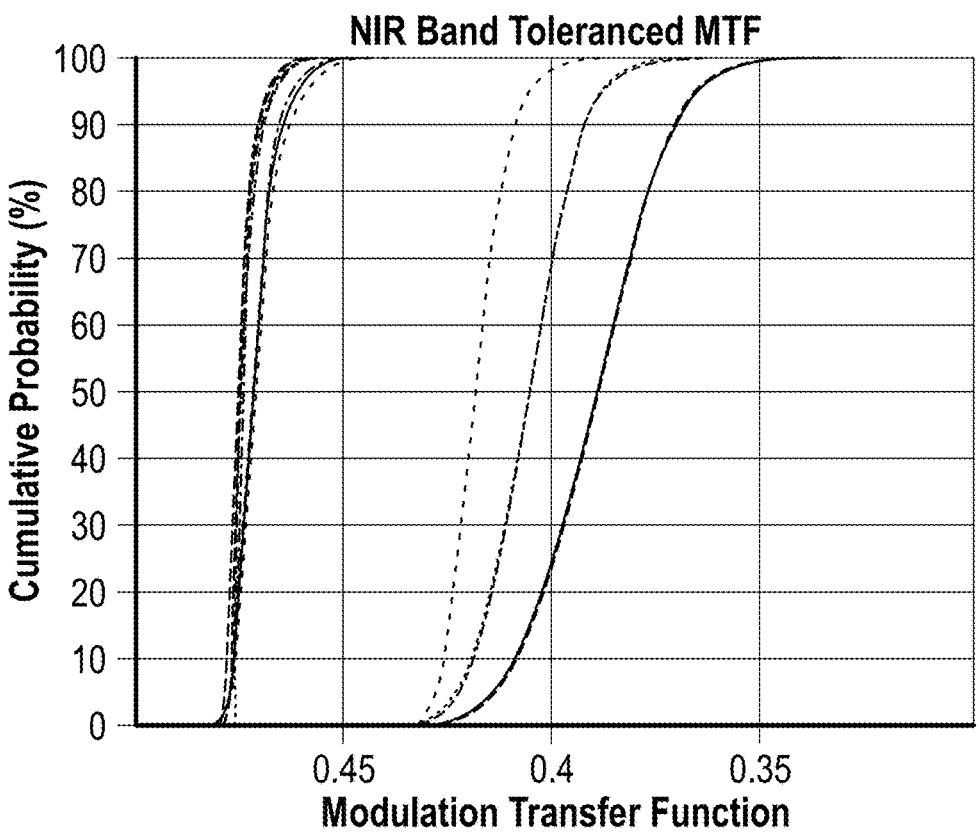
Figure 20A:
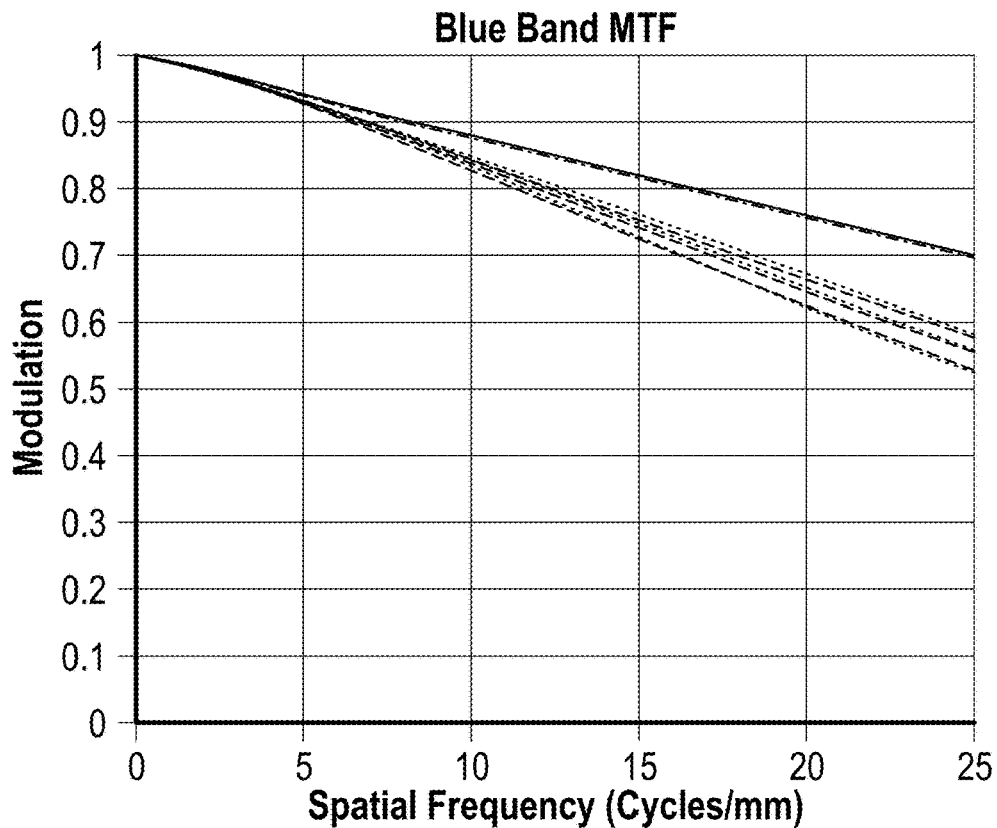
Figure 20B:
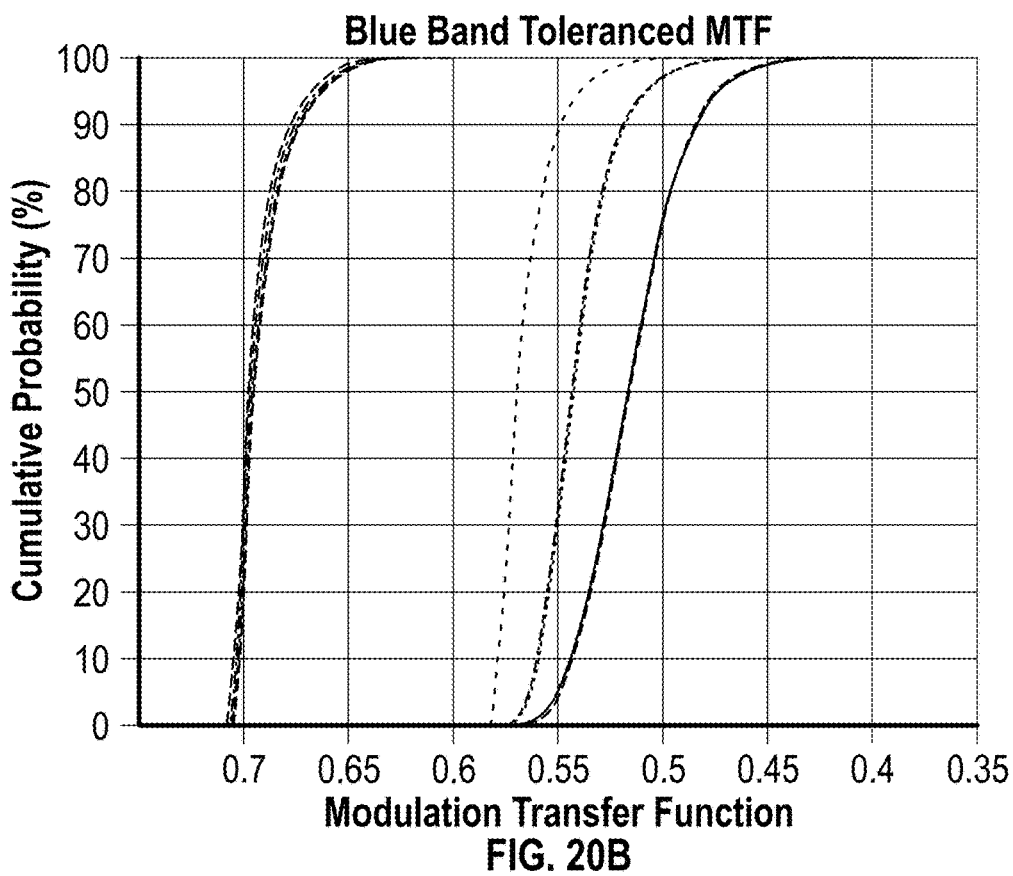

Referring to FIGS. 19A and 19B, the graphs present the optical design MTF and tolerance MTF, respectively, of the NIR band for the optical system 150. Referring to FIGS. 20A and 20B, the graphs present the optical design MTF and tolerance MTF, respectively, of the blue band for the optical system 150.

The estimated MTF values of the optical system 150 are summarized in Table 4. The design MTF of the panchromatic band is higher than 15% and the tolerance value is greater than 14%. For the multispectral bands, the results are different from the optical system 100. Due to the wide field-of-view (FOV) and their location in the FOV, the MTF drops are strange and get much harsher than for the optical system 100. The lowest multispectral MTF value is just above 40% at the outer field and surprisingly at the near-infrared band, which is located closer to optical axis. The tolerance values are managed to be higher than 35%.

TABLE 4

| Spectral bands | Design MTF | Tolerance MTF |
| --- | --- | --- |
| PAN (450~720 nm) | ≥15 | ≥14 |
| NIR (770~890 nm) | ≥40 | ≥35 |
| RED (630~690 nm) | ≥46 | ≥41 |
| GREEN (520~590 nm) | ≥49 | ≥44 |
| BLUE (450~520 nm) | ≥53 | ≥46 |

Figure 21B:
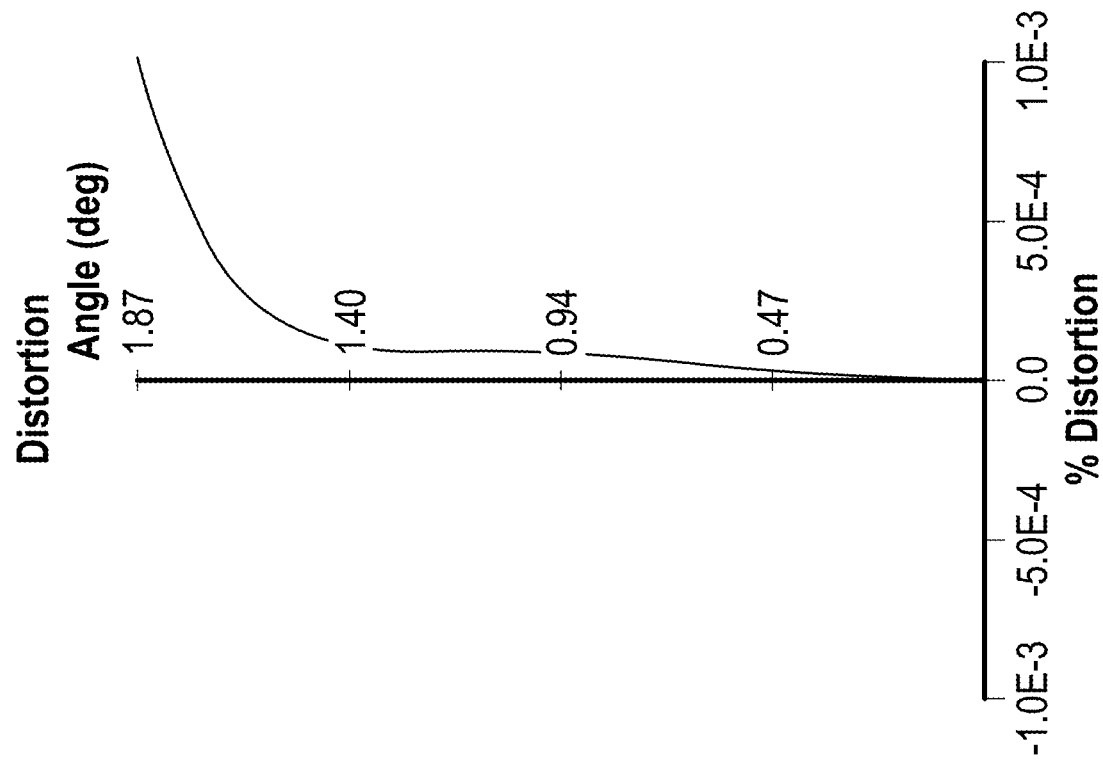
FIGS. 21A and 21B are graphical plots showing distortion performance for, respectively, the optical systems FIGS. 1A and 1C.
Figure 21A:
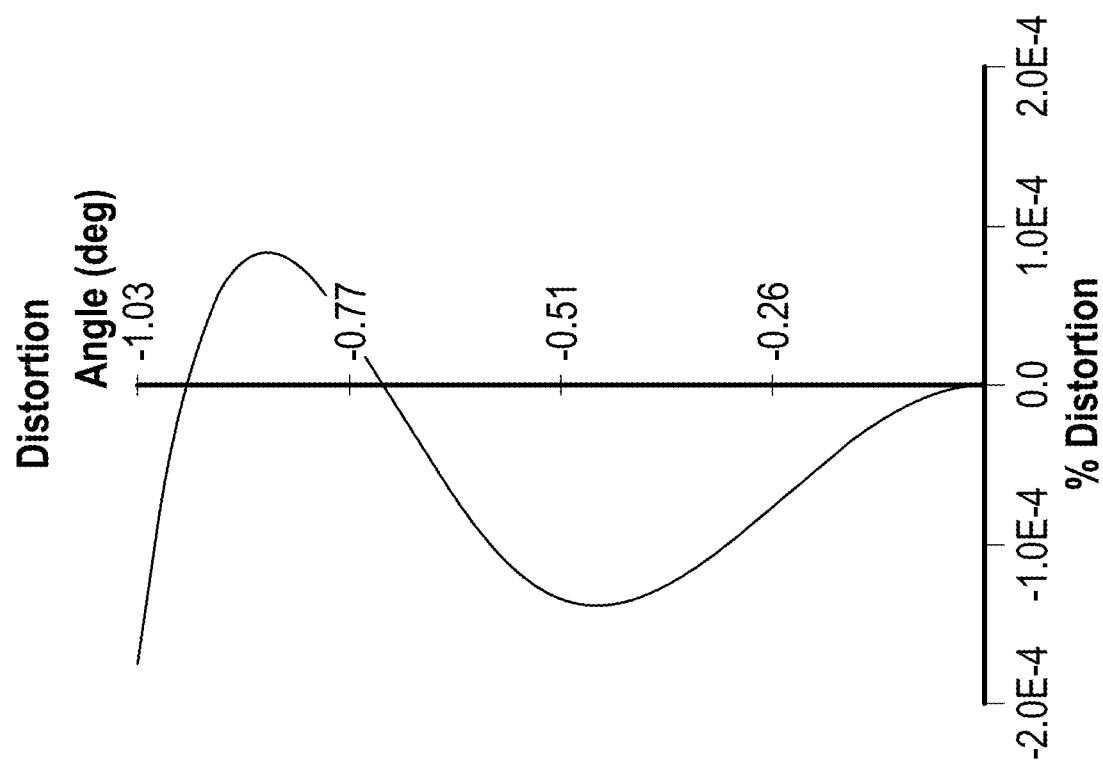

Referring to FIGS. 21A and 21B, the distortion performance of the optical system 100 and the optical system 150, respectively, is illustrated. The distortion magnitude of the optical system 150 is 0.08 micrometer, higher than that of the optical system 100, 0.02 micrometer at the edge, due to its larger field of view. But it should be noted that the distortion magnitudes of both camera systems are still much lower than 1/50 pixels, which leads to enough margin for TDI imaging and indicates much less probability of image quality degradation.

Despite having a small form factor, the optical system 100 has performance better than other camera systems in constellation operation as shown in Table 5. The optical system 100 is designed to have a ground sample distance of 0.9-meter and a swath-width of 10.8 kilometer at 500 kilometer altitude, which are comparable to or better than those of SKYSAT. It should be also highlighted that the optical system 100 can operate a panchromatic band and a near-infrared band simultaneously on the fly, which are optimized compatible with other remote sensing missions and the other cameras identified in Table 5 are lacking.

TABLE 5

| Parameters | Optical system 100 | SKYSAT [12] | BLACKSKY [5] | CARBONITE-2 [11] |
| --- | --- | --- | --- | --- |
| Orbit Altitude (km) | 500 | 500 | 450 | 550 |
| PAN GSD (m) | ≤0.9 | ≤0.9 | ≤1 | ≤1.2 |
| Spectral bands | PAN, RGB, NIR | RGB, NIR | PAN, Color | Color |
| Swath width (nadir, km) | ≤10.8 | ≤8 | ≤6.6 | ≤5.9 |
| Clear Aperture (mm) | ≤195 | ≤350 | ≤240 | ≤250 |
| Length (mm) | ≤300 | — | — | — |
| Video imaging | NA | Available | NA | Available |

The benefits of the optical system 150 over DOVE cameras are better resolution, diverse spectral bands and shorter in axial direction as shown in Table 6. At 500 kilometer altitude, the optical system 150 has a ground sample distance of 1.85 meters, which is half resolution of DOVE or PLANETSCOPE. The optical system 150 can be equipped with the customized spectral bands, which are essential to extract meaningful spectral information.

TABLE 6

| Parameters | Optical system 150 | DOVE or PS2 [2] |
| --- | --- | --- |
| Orbit Altitude (km) | 500 | 475 |
| Ground Sample Distance (m) | ≤1.85 | ≤3.7 |
| Spectral bands | PAN, RGB, NIR | Color |
| Swath width (nadir, km) | ≤14.8 | ≤24.6 |
| Clear Aperture (mm) | ≤95 | ≤90 |
| Length (mm) | ≤200 | — |

Advantages

The optical system is based on the 4-mirror all-reflective optical design and is free from chromatic aberration and distortion. Being free from chromatic aberration helps the optical system go beyond the visible spectral range so it can support imaging in the infrared and UV spectral range. Being distortion-free helps the optical system to support TDI imaging in orbit and precision metrics in post-processing.

Some of the prior art, especially the less expensive solutions, still relies heavily on a combination of lenses and mirrors in a catadioptric design, so that limits its application, or its optical design needs be revised from the beginning to adapt to a different spectral range. Furthermore, the catadioptric design does not easily embrace TDI imaging, especially for a wider field of view imaging because of inherent or residual aberrations.

The form factor is smaller compared to bigger, more massive systems of the prior systems. The optical system described herein has a much smaller form factor compared to the prior art. It is quite small so that it can be installed on a small flying object, including CUBESAT, minisatellite, airplane, UAV, drone, or balloon. It can also be onboard flying objects as a secondary or tertiary payload, which helps provide diverse missions or more opportunities for missions. The optical system is small and lightweight so that it helps reduce launch cost and increase the opportunity of a launch compared to the prior art. The benefit stands out when it comes to constellation operation, where launch cost is a driving factor. The optical system can be developed at a lower cost so that it is more affordable than the prior art. In developing the optical system, smaller test equipment and facilities can be used due to the smaller aperture size. Also, the optical system is lightweight, and it can be transported with lower logistics costs.

The developing process of the optical system can be automated more efficiently compared to the prior art. Developing the prior art, which is quite bigger, always mandates labor resources, leading to an increasing budget. For the optical system with its smaller aperture size and being lightweight, iterative or repetitive processes or procedures can be automated, even with affordable equipment. The processes may include optical alignment, optical measurements (such as wavefront error, modulation transfer function, a focal length, a field of view, instantaneous field of view, distortion, signal to noise ratio), and those under various conditions. In addition to the financial benefit, the optical system can sustain stability in operation because of shorter physical distance among mirrors.

The optical system is based on the 4-mirror optical design and provides design flexibility that is backed by a degree of freedom of the optical design. With a minimal modification of the optical design, it can be adapted to provide imaging in the modes of starring, scanning or pushbroom, video, stereo, BRDF (Bidirectional Reflectance Distribution Function), HDR (High Dynamic Range), Polarimetric, or low-light. The optical system, based on the 4-mirror optical design, can support panchromatic, multispectral, hyperspectral, infrared, and UV imaging with minimal design modification, mainly due to different pixel sizes. The optical system has a degree of freedom of optical design and can support super-resolution, high dynamic range, polarimetric, and other remote sensing or scientific imaging.

The optical system can support planetary or deep space missions, which mandates a small form factor for payload selection. The optical system can embrace diverse missions because of its affordability and launch opportunity, which may include AI-based imaging. The optical system can be used for a precision star sensor and a stellar sensor.

The optical system, based on the 4-mirror optical design, can support simultaneous multi-color imaging. It can include, for example, but is not limited to, panchromatic+RGB+near-infrared, visible+infrared (near-infrared, short-wave infrared, mid-wave infrared, or longwave infrared), visible+visible, infrared+infrared, UV+visible, or UV+infrared imaging.

The optical system, being of the small form factor, can be onboard the satellites of a non-imaging mission, like communication satellites (for example, Starlink of SpaceX). The optical system can also be installed on other imaging satellites, quasi-imaging satellites, like SAR mission, or scientific mission satellites. This functionality potentially leads to synchronous or asynchronous constellation operation of the optical system, which enhances the temporal resolution of imaging or increases imaging opportunity. Constellation operation of the prior art tends to mandate substantial fixed cost of expensive satellite and camera system, 24/7 operation of a dedicated control station, and non-automated image-receiving centers. The optical system enables synchronous or asynchronous constellation operations so that the resources for control and data receiving can be distributed, leading to significantly reduced fixed cost.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment may be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", "up to about," and "substantially" as used herein include the recited numbers, and also represent an amount or characteristic close to the stated amount or characteristic that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount or characteristic. Features of embodiments disclosed herein preceded by a term such as "approximately", "about", and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:
1. An all-reflective optical system, comprising:
   a concave primary mirror having a central aperture and a radius, the primary mirror having one of a parabolic, non-parabolic conical, or aspherical surface;
   a convex secondary mirror facing the primary mirror, the secondary mirror having an aspherical surface, wherein an optical axis extends from a vertex of the primary mirror to a vertex of the secondary mirror;

a concave tertiary mirror arranged behind the primary mirror, the tertiary mirror having one of a parabolic, non-parabolic conical, or aspherical surface;

a concave quaternary mirror arranged in the central aperture of the primary mirror or behind the primary mirror, the quaternary mirror having one of a spherical, parabolic, non-parabolic conical, or aspherical surface; and at least one image plane having one or more aggregated sensors, wherein the image plane is positioned at a radial distance from the optical axis that is no more than the radius of the primary mirror, and wherein a form factor, defined as a ratio of a distance between the secondary mirror and the tertiary mirror to an effective focal length of the optical system, is less than 0.09.

2. The optical system of claim 1, additionally comprising an entrance pupil positioned near the primary mirror or the secondary mirror, and an exit pupil or Lyot stop positioned at one of: 1) near the quaternary mirror, 2) between the tertiary mirror and the quaternary mirror, and 3) between the quaternary mirror and the image plane.

3. The optical system of claim 1, additionally comprising one or more folding mirrors arranged to deflect rays from the quaternary mirror to the image plane, wherein the one or more folding mirrors are configured to fold a ray path.

4. The optical system of claim 3, wherein based on using a first folding mirror, the exit pupil is positioned between the tertiary and the quaternary mirror, or between the quaternary mirror and the first folding mirror.

5. The optical system of claim 3, wherein one of the folding mirrors is tilted at a specific angle to the optical axis of the system.

6. The optical system of claim 3, wherein one of the folding mirrors positioned at the front of the image plane widens the field of view with reflective and transmissive sections over a same spectral range, wherein each section corresponds to a specific sensor of the one or more sensors.

7. The optical system of claim 3, wherein one of the folding mirrors positioned at the front of the image plane enables simultaneous multi-color imaging, wherein the one of the folding mirrors is reflective over a first spectral range and transmissive over other spectral ranges, and is reflective over a second spectral range and transmissive over other spectral ranges, wherein one of the aggregated sensors is dedicated to the first spectral range and a different one of the aggregated sensors is dedicated to the second spectral range.

8. The optical system of claim 3, wherein the folding mirrors enable simultaneous multi-color imaging, wherein each of the folding mirrors is reflective over a particular spectral range and transmissive over other spectral ranges, and wherein each added folding mirror and a corresponding one of the aggregated sensors is associated with a different spectral range.

9. The optical system of claim 3, wherein the system is adapted to support simultaneous multi-color imaging, including 1) panchromatic and RGB and near-infrared, 2) visible and infrared (near-infrared, shortwave infrared, midwave infrared, or longwave infrared), 3) visible and visible, 4) infrared and infrared, 5) UV and visible, or 6) UV and infrared imaging.

10. The optical system of claim 1, wherein the system has an imaging resolution better than 1 m at a 500 km altitude.

11. The optical system of claim 1, wherein the primary mirror and the secondary mirror are symmetric or periodic about the optical axis.

12. The optical system of claim 11, wherein a diagonal of a periodic mirror has an angle of zero degrees or 45 degrees from a diagonal of the image plane.

13. The optical system of claim 11, wherein the optical axis of the tertiary mirror does not coincide with a mechanical axis.

14. The optical system of claim 1, wherein a radius of the secondary mirror is in a range of 1% to 3% of an effective focal length, and a radius of the tertiary mirror is in a range of 2% to 3% of the effective focal length.

15. The optical system of claim 1, wherein a radius of the quaternary mirror is in a range of 6% to 22% of an effective focal length.

16. The optical system of claim 1, wherein a distance from the tertiary mirror to the image plane along the optical axis is in a range of 3% to 9% of an effective focal length and the distance from the secondary mirror to the tertiary mirror along the optical axis is in a range of 4% to 9% of the effective focal length.

17. The optical system of claim 1, wherein a diameter of the primary mirror ranges from 3% to 8% of an effective focal length.

18. The optical system of claim 1, wherein an exit pupil or Lyot stop distance from the primary mirrors is +/−1% of an effective focal length.

19. The optical system of claim 1, wherein an effective focal length is in a range of 300 mm to 20,000 mm.

20. The optical system of claim 1, further comprising supporting structure for one or more of the mirrors, wherein the supporting structure is additively manufactured.

21. An all-reflective optical system, comprising:
a concave primary mirror having a central aperture and a radius, the primary mirror having one of a parabolic, non-parabolic conical, or aspherical surface;
a convex secondary mirror facing the primary mirror, the secondary mirror having an aspherical surface, wherein an optical axis extends from a vertex of the primary mirror to a vertex of the secondary mirror;
a concave tertiary mirror arranged behind the primary mirror, the tertiary mirror having one of a parabolic, non-parabolic conical, or aspherical surface;
a concave quaternary mirror arranged in the central aperture of the primary mirror or behind the primary mirror, the quaternary mirror having one of a spherical, parabolic, non-parabolic conical, or aspherical surface; and
at least one image plane having one or more aggregated sensors, wherein the image plane is positioned at a radial distance from the optical axis that is no more than the radius of the primary mirror, and
wherein an exit pupil or Lyot stop distance from the primary mirror is +/−1% of an effective focal length.

22. An all-reflective optical system, comprising:
a concave primary mirror having a central aperture and a radius, the primary mirror having one of a parabolic, non-parabolic conical, or aspherical surface;
a convex secondary mirror facing the primary mirror, the secondary mirror having an aspherical surface, wherein an optical axis extends from a vertex of the primary mirror to a vertex of the secondary mirror;
a concave tertiary mirror arranged behind the primary mirror, the tertiary mirror having one of a parabolic, non-parabolic conical, or aspherical surface;
a concave quaternary mirror arranged in the central aperture of the primary mirror or behind the primary mirror, the quaternary mirror having one of a spherical, parabolic, non-parabolic conical, or aspherical surface;

at least one image plane having one or more aggregated sensors, wherein the image plane is positioned at a radial distance from the optical axis that is no more than the radius of the primary mirror; and a supporting structure for one or more of the mirrors, wherein the supporting structure is additively manufactured.

* * * * *

UNITED STATES PATENT AND TRADEMARK OFFICE
CERTIFICATE OF CORRECTION

PATENT NO. : 11,320,637 B2
APPLICATION NO. : 16/989635
DATED : May 3, 2022
INVENTOR(S) : Youngwan Choi It is certified that error appears in the above-identified patent and that said Letters Patent is hereby corrected as shown below:

On the Title Page

Page 2, Column 1, item [56], Line 3, delete "Opticalm" and insert -- Optical, --.

In the Specification

Column 15, Line 17, delete "have have" and insert -- have --.

Column 15, Line 20, delete "ut it" and insert -- It --.

Signed and Sealed this
Thirteenth Day of September, 2022

Katherine Kelly Vidal
*Director of the United States Patent and Trademark Office*